United States Patent
Turgeman

(10) Patent No.: US 10,055,560 B2
(45) Date of Patent: *Aug. 21, 2018

(54) DEVICE, METHOD, AND SYSTEM OF DETECTING MULTIPLE USERS ACCESSING THE SAME ACCOUNT

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 126 days.

This patent is subject to a terminal disclaimer.

(21) Appl. No.: 15/276,803

(22) Filed: Sep. 27, 2016

(65) Prior Publication Data

US 2017/0017781 A1    Jan. 19, 2017

Related U.S. Application Data

(63) Continuation of application No. 14/325,398, filed on Jul. 8, 2014, now Pat. No. 9,477,826, and a
(Continued)

(51) Int. Cl.
*G06F 21/50* (2013.01)
*G06F 21/31* (2013.01)
(Continued)

(52) U.S. Cl.
CPC .......... *G06F 21/316* (2013.01); *G06F 21/552* (2013.01); *H04L 63/08* (2013.01);
(Continued)

(58) Field of Classification Search
CPC ................ G06F 21/316; G06F 21/552; G06F 2221/2133; H04L 63/08; H04L 2463/082; H04W 12/06
See application file for complete search history.

(56) References Cited

U.S. PATENT DOCUMENTS 3,618,019 A   11/1971  Nemirovsky et al.
3,699,517 A   10/1972  Dyche
(Continued)

FOREIGN PATENT DOCUMENTS

EP   2410450   1/2012
EP   2477136   7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Kambiz Zand
*Assistant Examiner* — Tongoc Tran
(74) *Attorney, Agent, or Firm* — Eitan, Mehulal & Sadot

(57) ABSTRACT

Devices, systems, and methods of detecting user identity, differentiating between users of a computerized service, and detecting a possible attacker. The methods include monitoring of user-side input-unit interactions, in general and in response to an interference introduced to user-interface elements. The monitored interactions are used for detecting an attacker that utilizes a remote access channel; for detecting a malicious automatic script, as well as malicious code injection; to identify a particular hardware assembly; to perform user segmentation or user characterization; to enable a visual login process with implicit two-factor authentication; to enable stochastic cryptography; and to detect that multiple users are utilizing the same subscription account.

13 Claims, 5 Drawing Sheets

Related U.S. Application Data continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 14/325,398 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703.

(60) Provisional application No. 61/843,915, filed on Jul. 9, 2013, provisional application No. 61/417,479, filed on Nov. 29, 2010.

(51) Int. Cl.
  *H04W 12/06* (2009.01)
  *H04L 29/06* (2006.01)
  *G06F 21/55* (2013.01)

(52) U.S. Cl.
  CPC ..... *H04W 12/06* (2013.01); *G06F 2221/2133* (2013.01); *H04L 2463/082* (2013.01)

(56) References Cited

U.S. PATENT DOCUMENTS

| | | | |
|---|---|---|---|
| 3,983,535 A | 9/1976 | Herbst et al. | |
| 4,128,829 A | 12/1978 | Herbst et al. | |
| 4,621,334 A | 11/1986 | Garcia | |
| 4,760,386 A | 7/1988 | Heath et al. | |
| 4,805,222 A | 2/1989 | Young et al. | |
| 5,485,171 A | 1/1996 | Copper et al. | |
| 5,557,686 A | 9/1996 | Brown et al. | |
| 5,838,306 A | 11/1998 | O'Connor et al. | |
| 5,874,941 A | 2/1999 | Yamada | |
| 6,337,686 B2 | 1/2002 | Wong et al. | |
| 6,337,919 B1 | 1/2002 | Dunton | |
| 6,572,014 B1 | 6/2003 | Lambert | |
| 6,819,219 B1 | 11/2004 | Bolle | |
| 6,938,061 B1 | 8/2005 | Rumynin et al. | |
| 6,938,159 B1 | 8/2005 | O'Connor et al. | |
| 6,957,185 B1 | 10/2005 | Labaton | |
| 6,957,186 B1 | 10/2005 | Guheen et al. | |
| 6,983,061 B2 | 1/2006 | Ikegami et al. | |
| 7,130,452 B2 | 10/2006 | Bolle et al. | |
| 7,133,792 B2 | 11/2006 | Murakami et al. | |
| 7,139,916 B2 | 11/2006 | Billingsley et al. | |
| 7,245,218 B2 | 7/2007 | Ikehara et al. | |
| 7,494,061 B2 | 2/2009 | Reinhold | |
| 7,523,191 B1 | 4/2009 | Thomas et al. | |
| 7,606,915 B1 | 10/2009 | Calinov et al. | |
| 7,796,013 B2 | 9/2010 | Murakami et al. | |
| 7,818,290 B2 | 10/2010 | Davis et al. | |
| 8,417,960 B2 | 4/2013 | Takahashi et al. | |
| 8,433,785 B2 | 4/2013 | Awadallah et al. | |
| 8,510,113 B1 | 8/2013 | Conkie et al. | |
| 8,548,208 B2 | 10/2013 | Schultz | |
| 9,154,534 B1 | 10/2015 | Gayles et al. | |
| 9,174,123 B2 | 11/2015 | Nasiri et al. | |
| 9,282,112 B2 | 3/2016 | Filatov | |
| 9,301,140 B1 | 3/2016 | Costigan et al. | |
| 9,304,915 B2 | 4/2016 | Adams et al. | |
| 9,529,987 B2 * | 12/2016 | Deutschmann | H04L 67/22 |
| 2002/0089412 A1 | 7/2002 | Heger et al. | |
| 2003/0033526 A1 | 2/2003 | French et al. | |
| 2003/0074201 A1 | 4/2003 | Grashey et al. | |
| 2003/0212811 A1 | 11/2003 | Thornton | |
| 2004/0015714 A1 | 1/2004 | Abraham et al. | |
| 2004/0062423 A1 | 4/2004 | Doi | |
| 2004/0111523 A1 | 6/2004 | Hall et al. | |
| 2005/0008148 A1 | 1/2005 | Jacobson | |
| 2005/0179657 A1 | 8/2005 | Russo et al. | |
| 2005/0289264 A1 | 12/2005 | Illowsky et al. | |
| 2006/0006803 A1 | 1/2006 | Huang et al. | |
| 2006/0143454 A1 | 6/2006 | Walmsley | |
| 2006/0195328 A1 | 8/2006 | Abraham et al. | |
| 2006/0215886 A1 | 9/2006 | Black | |
| 2006/0224898 A1 | 10/2006 | Ahmed | |
| 2006/0282660 A1 | 12/2006 | Varghese et al. | |
| 2006/0284969 A1 | 12/2006 | Kim et al. | |
| 2007/0183633 A1 | 8/2007 | Hoffmann | |
| 2007/0214426 A1 | 9/2007 | Ruelle et al. | |
| 2007/0255821 A1 | 11/2007 | Ge et al. | |
| 2007/0266305 A1 | 11/2007 | Cong et al. | |
| 2007/0271466 A1 | 11/2007 | Mak et al. | |
| 2007/0283416 A1 | 12/2007 | Renaud | |
| 2008/0091639 A1 | 4/2008 | Davis et al. | |
| 2008/0092209 A1 * | 4/2008 | Davis | G06F 21/316 726/2 |
| 2008/0162449 A1 | 7/2008 | Chao-Yu et al. | |
| 2008/0183745 A1 | 7/2008 | Cancel et al. | |
| 2008/0211766 A1 | 9/2008 | Westerman et al. | |
| 2008/0215576 A1 | 9/2008 | Zhao et al. | |
| 2008/0301808 A1 | 12/2008 | Calo et al. | |
| 2009/0089879 A1 | 4/2009 | Wang et al. | |
| 2009/0094311 A1 | 4/2009 | Awadallah et al. | |
| 2009/0189736 A1 | 7/2009 | Hayashi | |
| 2009/0199296 A1 | 8/2009 | Xie et al. | |
| 2009/0254336 A1 | 10/2009 | Dumais et al. | |
| 2009/0293119 A1 | 11/2009 | Jonsson | |
| 2009/0320123 A1 | 12/2009 | Yu et al. | |
| 2010/0042403 A1 | 2/2010 | Chandrasekar et al. | |
| 2010/0046806 A1 | 2/2010 | Baughman et al. | |
| 2010/0077470 A1 | 3/2010 | Kozat et al. | |
| 2010/0082747 A1 | 4/2010 | Yue et al. | |
| 2010/0082998 A1 | 4/2010 | Kohavi | |
| 2010/0115610 A1 * | 5/2010 | Tredoux | G06F 21/316 726/19 |
| 2010/0122082 A1 | 5/2010 | Deng et al. | |
| 2010/0125816 A1 | 5/2010 | Bezos | |
| 2010/0281539 A1 | 11/2010 | Burns et al. | |
| 2010/0328074 A1 | 12/2010 | Johnson et al. | |
| 2011/0012829 A1 | 1/2011 | Yao | |
| 2011/0016320 A1 | 1/2011 | Bergsten et al. | |
| 2011/0023115 A1 | 1/2011 | Wright | |
| 2011/0029902 A1 | 2/2011 | Bailey | |
| 2011/0063211 A1 | 3/2011 | Hoerl et al. | |
| 2011/0065504 A1 | 3/2011 | Dugan et al. | |
| 2011/0102570 A1 | 5/2011 | Wilf et al. | |
| 2011/0113388 A1 | 5/2011 | Eisen et al. | |
| 2011/0154273 A1 | 6/2011 | Aburada et al. | |
| 2011/0162076 A1 | 6/2011 | Song et al. | |
| 2011/0191820 A1 | 8/2011 | Ivey | |
| 2011/0193737 A1 | 8/2011 | Chiueh | |
| 2011/0202453 A1 | 8/2011 | Issa et al. | |
| 2011/0246902 A1 | 10/2011 | Tsai et al. | |
| 2011/0251823 A1 | 10/2011 | Davis et al. | |
| 2011/0271342 A1 | 11/2011 | Chung et al. | |
| 2011/0276414 A1 | 11/2011 | Subbarao et al. | |
| 2011/0304531 A1 * | 12/2011 | Brooks | G06F 1/1626 345/156 |
| 2012/0005483 A1 | 1/2012 | Patvarczki et al. | |
| 2012/0054834 A1 | 3/2012 | King | |
| 2012/0096555 A1 | 4/2012 | Mahaffey | |
| 2012/0133055 A1 | 5/2012 | Machida | |
| 2012/0154173 A1 | 6/2012 | Chang et al. | |
| 2012/0154273 A1 | 6/2012 | Mcdade et al. | |
| 2012/0154823 A1 | 6/2012 | Sakamoto | |
| 2012/0167170 A1 | 6/2012 | Shi | |
| 2012/0218193 A1 | 8/2012 | Weber et al. | |
| 2012/0246737 A1 * | 9/2012 | Paxton | G06F 21/316 726/27 |
| 2012/0278804 A1 | 11/2012 | Narayanasamy et al. | |
| 2013/0036416 A1 | 2/2013 | Raju et al. | |
| 2013/0076650 A1 * | 3/2013 | Vik | G06F 3/0418 345/173 |
| 2013/0097682 A1 | 4/2013 | Zeljkovic et al. | |
| 2013/0097706 A1 | 4/2013 | Titonis | |
| 2013/0111586 A1 | 5/2013 | Jackson | |
| 2013/0133055 A1 | 5/2013 | Ali et al. | |
| 2013/0135218 A1 | 5/2013 | Jain | |

(56) References Cited

U.S. PATENT DOCUMENTS

| | | | |
|---|---|---|---|
| 2013/0154999 A1 | 6/2013 | Guard | |
| 2013/0167212 A1 | 6/2013 | Azar et al. | |
| 2013/0282637 A1* | 10/2013 | Costigan | G06N 5/022 |
| | | | 706/46 |
| 2013/0305357 A1 | 11/2013 | Ayyagari et al. | |
| 2014/0033317 A1 | 1/2014 | Barber | |
| 2014/0078061 A1 | 3/2014 | Simons et al. | |
| 2014/0078193 A1 | 3/2014 | Bamhoefer et al. | |
| 2014/0082369 A1 | 3/2014 | Waclawsky et al. | |
| 2014/0143304 A1 | 5/2014 | Hegarty et al. | |
| 2014/0196119 A1 | 7/2014 | Hill et al. | |
| 2014/0200953 A1 | 7/2014 | Mun | |
| 2014/0250538 A1 | 9/2014 | Rapaport et al. | |
| 2014/0259130 A1 | 9/2014 | Li et al. | |
| 2014/0283059 A1 | 9/2014 | Sambamurthy et al. | |
| 2014/0317734 A1 | 10/2014 | Valencia et al. | |
| 2014/0344927 A1 | 11/2014 | Turgeman et al. | |
| 2015/0012920 A1 | 1/2015 | De Santis et al. | |
| 2015/0101031 A1 | 4/2015 | Harjanto et al. | |
| 2016/0006800 A1 | 1/2016 | Summers et al. | |
| 2016/0042164 A1 | 2/2016 | Goldsmith et al. | |
| 2016/0164905 A1 | 6/2016 | Pinney Wood et al. | |
| 2016/0164906 A1 | 6/2016 | Pinney Wood et al. | |
| 2017/0048272 A1 | 2/2017 | Yamamura et al. | |

FOREIGN PATENT DOCUMENTS

| | | |
|---|---|---|
| EP | 2610776 | 7/2013 |
| WO | 2007146437 | 12/2007 |
| WO | 2012073233 | 6/2012 |

OTHER PUBLICATIONS

Bailey, Kyle O., "Computer Based Behavioral Biometric Authentication Via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

\* cited by examiner

DEVICE, METHOD, AND SYSTEM OF DETECTING MULTIPLE USERS ACCESSING THE SAME ACCOUNT

CROSS-REFERENCE TO RELATED APPLICATIONS

This application is a Continuation-in-Part (CIP) of U.S. patent application Ser. No. 14/325,398, filed on Jul. 8, 2014, which is hereby incorporated by reference in its entirety.

The above-mentioned U.S. patent application Ser. No. 14/325,398 claims priority and benefit from U.S. provisional patent application No. 61/843,915, filed on Jul. 9, 2013, which is hereby incorporated by reference in its entirety.

The above-mentioned U.S. patent application Ser. No. 14/325,398 is a Continuation-in-Part (CIP) of U.S. patent application Ser. No. 13/922,271, filed on Jun. 20, 2013, now U.S. Pat. No. 8,938,787, which is hereby incorporated by reference in its entirety.

The above-mentioned U.S. patent application Ser. No. 14/325,398 is a Continuation-in-Part (CIP) of U.S. patent application Ser. No. 13/877,676, filed on Apr. 4, 2013, now U.S. Pat. No. 9,069,942; which was a National Phase of PCT International Application number PCT/IL2011/000907, filed on Nov. 29, 2011; which claimed priority and benefit from U.S. provisional patent application No. 61/417,479, filed on Nov. 29, 2010; all of which are hereby incorporated by reference in their entirety.

The above-mentioned U.S. patent application Ser. No. 14/325,398 is a Continuation-in-Part (CIP) of U.S. patent application Ser. No. 14/320,653, filed on Jul. 1, 2014, now U.S. Pat. No. 9,275,337, which is hereby incorporated by reference in its entirety.

The above-mentioned U.S. patent application Ser. No. 14/325,398 is a Continuation-in-Part (CIP) of U.S. patent application Ser. No. 14/320,656, filed on Jul. 1, 2014, which is hereby incorporated by reference in its entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device, for determining whether or not an electronic device is being used by a fraudulent user, and/or for differentiating between users of a computerized service or between users of an electronic device.

Some embodiments may include devices, systems, and methods of detecting user identity, differentiating between users of a computerized service, and detecting a possible attacker. The methods may include, for example: monitoring of user-side input-unit interactions, in general and in response to an interference introduced to user-interface elements. The monitored interactions are used for detecting an attacker that utilizes a remote access channel; for detecting a malicious automatic script, as well as malicious code injection; to identify a particular hardware assembly; to perform user segmentation or user characterization; to enable a visual login process with implicit two-factor authentication; to enable stochastic cryptography; and to detect that multiple users are utilizing the same subscription account.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

DETAILED DESCRIPTION OF THE PRESENT INVENTION

Figure 1:
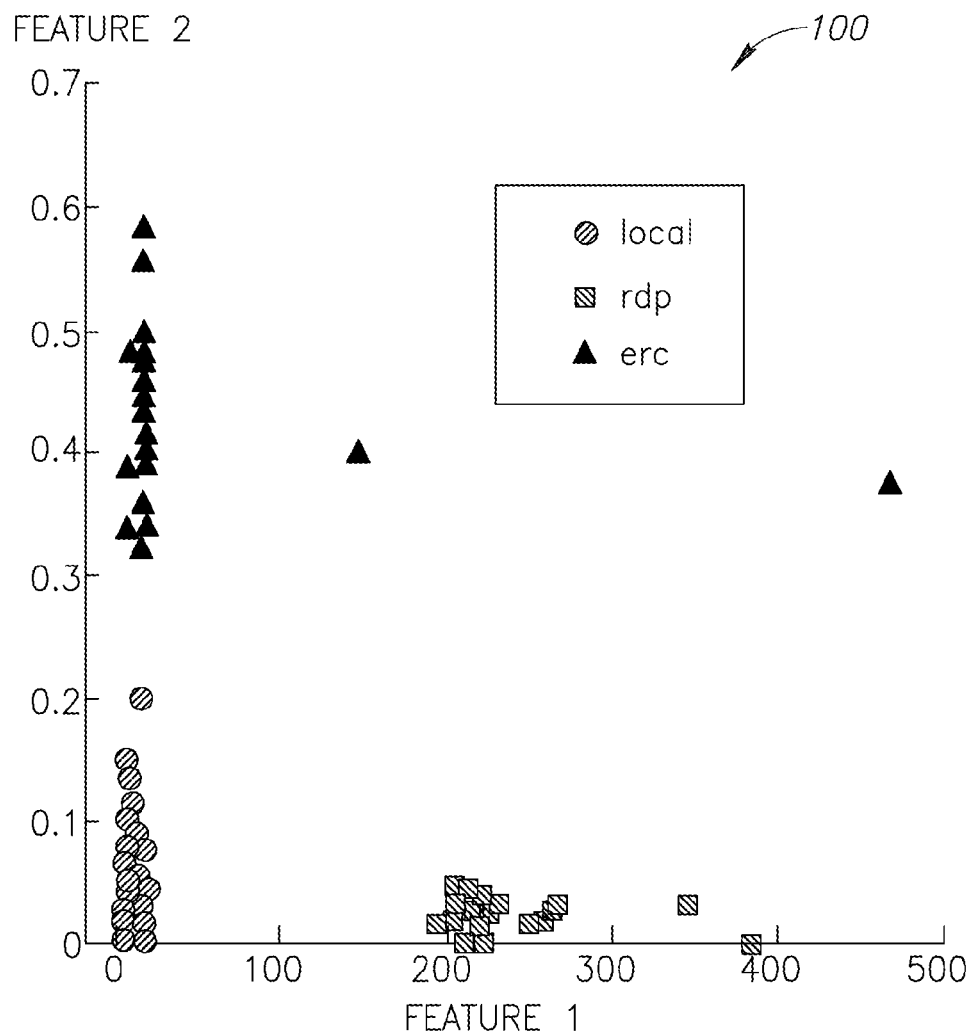
FIG. 1 is a scatter-graph demonstrating differentiation among users, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The present invention may include detection and/or prevention of Remote Access Trojan (RAT) attacks. For example, a RAT may include a computer program or malware designed to give an attacker full access to a victim's computer. The present invention may protect a computer user from RAT attacks, by using transparent Behavioral Biometrics methods which may be based on analysis of interactions through mouse, keyboard and/or touch interfaces. The system may utilize an Invisible Challenge-Response mechanism that proactively generates larger amount of additional behavioral biometric data without users noticing any change to the user experience. The RAT catcher module of the present invention may utilize knowledge of remote access protocols to provide tailored made yet robust detection and prevention techniques.

Cybercriminals use RAT to gain ultimate access to infected victim computer(s). Using the victim's access privileges and hardware fingerprint, they can access and steal sensitive business and personal data bypassing hardware detection security. Many types of Advanced Persistent Threat (APT) attacks take advantage of RAT technology for bypassing strong authentication and are commercially available (e.g., Poison Ivy, Dark Comet, Silent VNC, Zeus Plugin, Silent Team Viewer). These may be maliciously installed on a victim's computer using drive-by-download and spear-phishing tactics.

In a demonstrative RAT attack, a hacker's computer communicates with a hacker's command-and-control server; which communicates with a victim's computer; which communicates with a service provider (e.g., an online banking service). The victim's computer sends (through the hacker's command-and-control server) to the hacker's computer, the screen and cursor data that the victim computer "sees" when it interacts with the service provider; whereas, the hacker's computer sends (through the hacker's command-and-control server) to the victim's computer mouse data, keyboard data, or other input unit data, which the victim's computer sends further to the service provider. The victim's computer sends out malicious or fraudulent interactions to the service provider, through the hardware of the victim's computer; thereby traversing any hardware identification system.

There are multiple protocols for implementing RAT. Some are proprietary and not published, while others are known. For instance, RFB ("remote frame buffer") protocol works at the frame buffer level, and thus it is applicable to all windowing systems and applications, including X11, Windows and Macintosh. RFB is the protocol used in Virtual Network Computing (VNC) and its derivatives. The latter is commonly used by a fraudster (e.g., Silent VNC). Another example is the Remote Desktop Protocol (RDP) developed by Microsoft, which may be used for cybercrime. Moreover, some fraudsters may utilize proprietary software such as TeamViewer for creating a silent fraud-style version or write their own tool from scratch.

In an experiment in accordance with the present invention, 255 users entered a website designed to be similar to PayPal login screen, and entered an email address, a password, and clicked a login button. Most users accessed the website directly, while 60 users were requested to access it through a web-based remote access tool (Dell SonicWALL, and Ericom AccessNow). The system of the present invention was able to detect RAT with 100% true detection rate, and with 0% false detection rate.

Reference is made to FIG. 1, which is a scatter-graph 100 demonstrating the differentiation that may be achieved, in accordance with some demonstrative embodiments of the present invention. The vertical axis indicates a first user-specific feature or characteristic, measured or extracted from monitored user interaction (for example, average curvature of mouse movement). The horizontal axis indicates a second user-specific feature or characteristic, measured or extracted from monitored user interaction (for example, mouse movement speed in one or more directions). Other suitable user-specific traits may be extracted, estimated, and/or charted or graphed.

Samples of interactions from a local are indicated with circles; samples of interactions from a user utilizing a first RAT mechanism (RDP through SonicWall) are indicated with squares; samples of interactions from a user utilizing a second RAT mechanism (Ercom AccessNow) are indicated with triangles. The two different RAT systems operate in different (non-similar) manner; and both of them, and each one of them, is different from the characteristic of a local (genuine, non-RAT) user. The present invention may thus place user characteristics (interaction features) on a similar chart or graph, utilizing one-dimension, two-dimensions, or multiple dimensions; in order to distinguish between a genuine local user, and a fraudster (human hacker, or automatic script or "bot") that utilizes a RAT-based mechanism, to access the service.

Figure 2A:
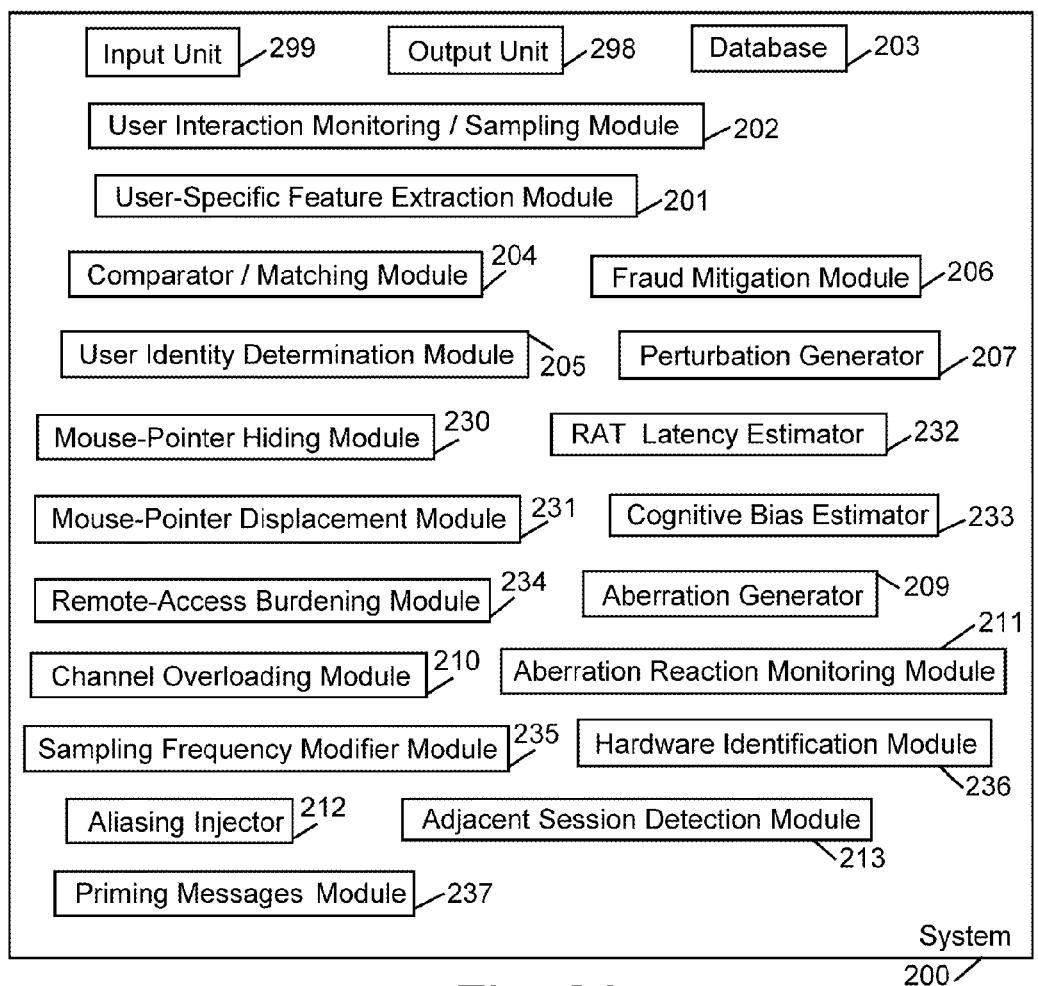
FIGS. 2A-2B are schematic block-diagram illustrations of a system, in accordance with some demonstrative embodiments of the present invention.
Figure 2B:
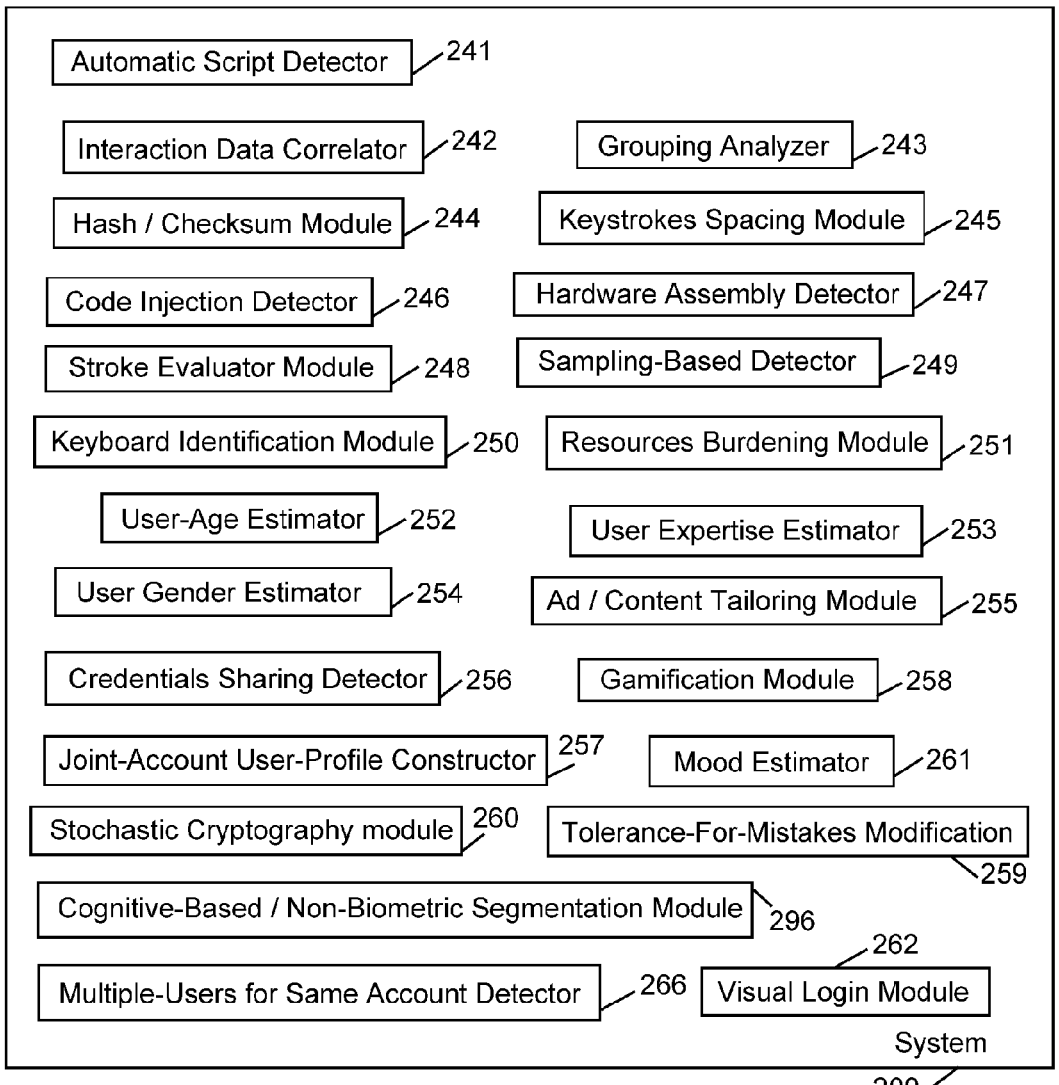

Reference is made to FIGS. 2A-2B, which are schematic block-diagram illustration of a system 200 in accordance with some demonstrative embodiments of the present invention. System 200 may comprise numerous components and/or modules; due to space limitations in the drawings, the components and/or modules of system 200 have been distributed over two drawings (FIG. 2A and FIG. 2B), which may be regarded or implemented as a single combined system 200 which may comprise some or all of the modules shown in FIG. 2A and/or in FIG. 2B, as if they were shown together within a single unified drawing.

System 200 may be implemented by using suitable hardware components and/or software modules, which may be co-located or may be distributed over multiple locations or multiple devices. Components and/or modules of system 200 may interact or communicate over one or more wireless communication links, wired communication links, cellular communication, client/server architecture, peer-to-peer architecture, or the like.

System 200 may comprise a user-specific feature extraction module 201, which may extract or estimate user-specific features or traits or characteristics, that characterize an interaction (or a set or batch of interactions, or a session of interactions) of a user with a service, through an input unit 299 (e.g., mouse, keyboard, stylus, touch-screen) and an output unit 298 (e.g., monitor, screen, touch-screen) that the user utilizes for such interactions. A user interaction monitoring/sampling module 202 may monitor all user interactions and may record, capture, or otherwise sample such interactions, and/or may otherwise collect user interaction data which may enable the user-specific feature extraction module 201 to extract or estimate user-specific features of the interaction. A database 203 may store records of users and their respective estimated user-specific feature values.

A comparator/matching module 204 may compare or match, between values of user-specific features that are extracted in a current user session (or user interaction), and values of respective previously-captured or previously-extracted user-specific features (of the current user, and/or of other users, and/or of pre-defined sets of values that correspond to known automated scripts or "bots" or RAT mechanism). If the comparator/matching module 204 determines that one or more features, or a set of features, that characterize the current interaction session of the current user, does not match those features as extracted in previous interaction session(s) of that user, then, a possible-fraud signal may be sent or transmitted to other modules of the system 200 and/or to particular recipients. The user-specific features, whose values may be compared or matched across usage-sessions, may include, for example, curvature (or curvature radius) of mouse movement or mouse strokes; acceleration and/or speed of mouse movement in one or more directions; and/or other suitable features.

Optionally, additionally or alternatively, the comparator/matching module 204 may compare the features characterizing the current session of the current user, to features characterizing known RAT mechanisms, known malware or "bot" mechanisms, or other pre-defined data; in order to determine that, possibly or certainly, the current user is actually a non-genuine user and/or is accessing the service via a RAT mechanism.

In some embodiments, the output of comparator module 204 may be taken into account in combination with other information, security information, user information, metadata, session data, risk factors, or other indicators (e.g., the IP address of the user; whether or not the user is attempting to perform a high-risk activity such as wire transfer; whether or not the user is attempting to perform a new type of activity that this user did not perform in the past at all, or did not perform in the past 1 or 3 or 6 or 12 months or other time-period; or the like). The combined factors and data may be taken into account by a user identity determination module 205, which may determine whether or not the current user is a fraudster or is possibly a fraudster. The user identity determination module 205 may trigger or activate a fraud mitigation module 206 able to perform one or more fraud mitigating steps based on that determination; for example, by requiring the current user to respond to a challenge, to answer security question(s), to contact customer service by phone, to perform two-step authentication or two-factor authentication, or the like.

The present invention may utilize active sensing and preventing of RAT, based on examination of different remote access protocols, operation systems, hardware and viruses in a controlled environment and under different network configurations. RAT detection may be achieved or improved by using a perturbation generator module 207, able to introduce active perturbation(s) on the client computer, which may not affect the local (genuine) user but may help to detect or even prevent remote user functionality or a RAT-based user, thereby making the RAT-catching system of the present invention more robust and efficient, allowing to both detect and prevent RAT in various protocols and scenarios with zero or near-zero false rejection rates.

Some embodiments may utilize a mouse-pointer hiding module 230, able to cause the mouse-pointer to "disappear" or vanish or be non-visible or be less visible on a screen or monitor of a remote user (who utilizes a RAT mechanism), while the mouse-pointer is fully-visible or at least partially-visible (or continuously visible) on the victim's computer screen; or vice versa. In some embodiments, the mouse-pointer hiding module 230 may operate to avoid showing a mouse-pointer on the victim's computer screen (e.g., by showing a white-on-white arrow, or a transparent arrow), while the victim's computer continues to transmit or transfer mouse-pointer coordinates to the remote attacker's computer which presents (on the screen of the attacker's computer) a visible mouse-pointer based on the transmitted pointer coordinates; and in such case, the system may differentiate or distinguish between users, since for example, the remote attacker may continue to operate regularly with regular mouse movements (as he is able to see the mouse-pointer on the attacker's computer screen), whereas a genuine local user may not see locally the mouse-pointer and may perform reactive operations (e.g., may move his mouse in a circle, or may move his mouse sideways back-and-forth, or up-and-down; or may press the Escape key, or may perform hectic mouse movements).

In another implementation, a mouse-pointer displacement module 231 may operate to cause displacement of the mouse-pointer (e.g., an arrow or other cursor or pointer), visible on the remote attacker's screen, relative to the mouse-pointer that is visible on the victim's screen. For example, the mouse-pointer displacement module 231 may replace the mouse-pointer in the victim's computer with a large transparent image (e.g., square or rectangle; for example, 150×150 pixels, or 200×200 pixels), having a smaller arrow (e.g., 10 or 15 or 20 pixels long) at an edge or corner or side-region of the image. The remote attacker's computer may present the mouse-pointer according to the coordinates of the center of the image (the center of the square or rectangle); and as a result, a click or double-click performed by the remote attacker, based on the location of the center of the large image, would actually be displaced or deviated relative to the location of the arrow that is visible on the victim's computer. The system may utilize this deviation or displacement of the mouse-pointer, to distinguish among users; for example, the remote attacker (whose computer shows an arrow based on transmitted cursor coordinates) would click "correctly" on buttons or fields or items; whereas a genuine local user, who sees a "displaced" arrow shown in a corner or an edge of a greater transparent rectangle, would click "incorrectly" on white spaces or in proximity to GUI elements (e.g., near buttons, near text-fields, near radio-buttons, near checkboxes) but not inside them.

Figure 3A:
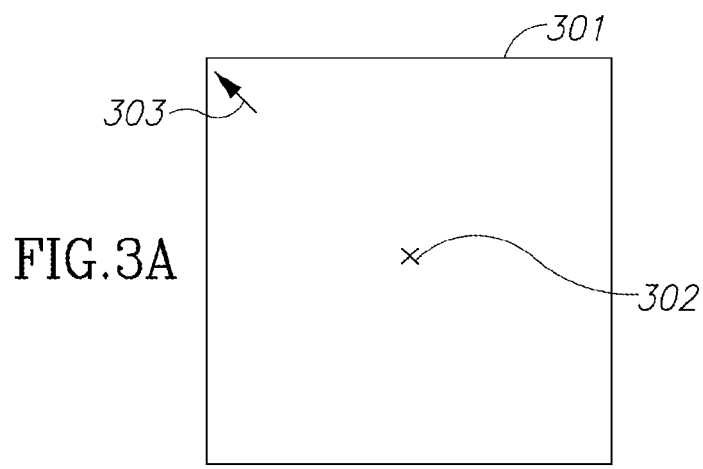
FIGS. 3A-3C are schematic illustrations of a modified mouse-pointer which may be used for distinguishing a local (genuine) user from a remote attacker, in accordance with some demonstrative embodiments of the present invention.
Figure 3B:
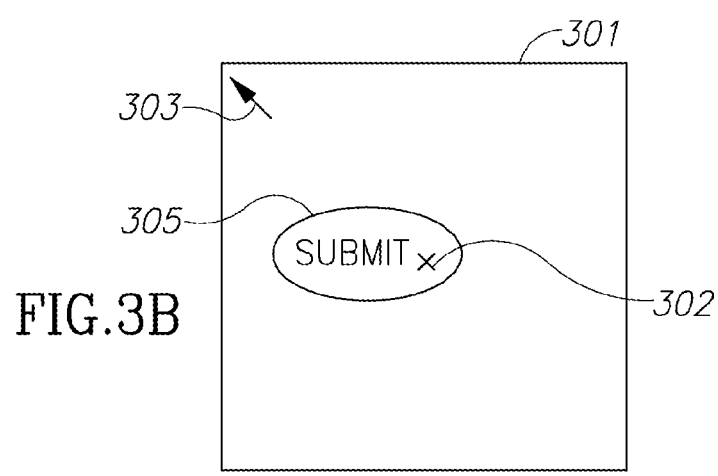
Figure 3C:
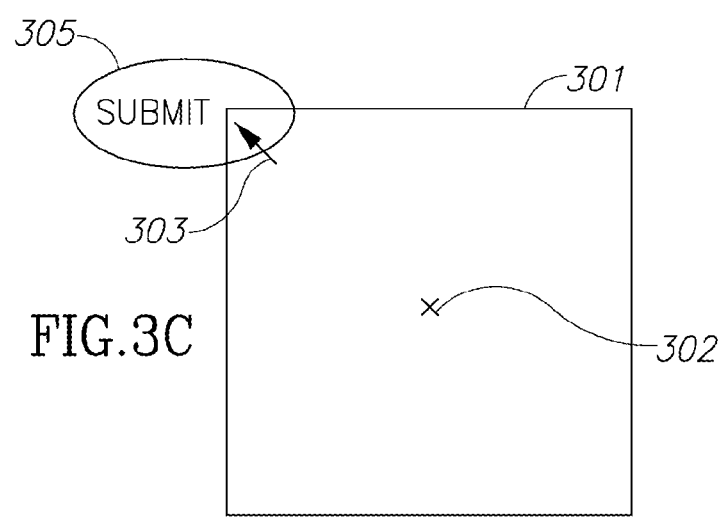

Reference is made to FIGS. 3A-3C, which are schematic illustrations of a modified mouse-pointer which may be used for distinguishing a local (genuine) user from a remote attacker, in accordance with some demonstrative embodiments of the present invention.

As shown in FIG. 3A, the mouse-pointer of a computing device (which belongs to the genuine user, the local user) may be modified or changed or replaced with a rectangular or square-shaped image 301, having a "fake" arrow pointer 303 in its upper-left corner. The center 302 of the image 301 is denoted with "x" in FIGS. 3A-3C, in order to facilitate the discussion herein, but no "x" and no other indication is actually shown at or near the center 302 of the image 301. Similarly, the frame of image 301 is shown in FIGS. 3A-3C for explanatory purposes, but is not shown on the screen in the actual implementation. The result of replacing the mouse-pointer with image 301 is, that a "fake" arrow 303 is shown at the corner, away from the "real" center 302 which is empty and does not show any pointer.

FIG. 3B demonstrates how a remote attacker is able to correctly and/or rapidly click on a "submit" button 305. The remote attacker's computer receives from the victim's computer the coordinates of the center 302, and the remote attacker's computer shows to the attacker (on his remote computer) a mouse-pointer at that center 302; the remote attacker brings that mouse-pointer into the "submit" button 305, and is able to correctly click within the submit button.

In contrast, FIG. 3C demonstrates how the local genuine user is not able to correctly (or rapidly) click within the "submit" button 305. The local user does not see the mouse-pointer at the center 302 of the image 301; rather, the local user sees only the "fake" arrow 303 at the corner of image 301. Therefore, the local user may move his mouse to bring that "fake" arrow 303 into the "submit" button 305, and may click on the mouse button there. However, such mouse-click will not actuate the "submit" button 305, because only the "fake" arrow is within the boundaries of the "submit" button 305, whereas the "real" coordinates of the center 302 are deviated away, externally to the "submit" button 305. Accordingly, the local user may be clicking (sometimes repeatedly, several times in a row) within a white area, or within area that is not occupied by GUI elements. This may enable system 200 to differentiate between the local genuine user and the remote attacker.

Referring again to FIGS. 2A-2B, in another implementation, a RAT latency estimator 232 may be used in order estimate whether a current user is a local (genuine) user or a remote (fraudulent, RAT-based) user, by introducing or generating or injecting an aberration or perturbation or interference or anomaly (e.g., a UI-based or GUI-based aberration or perturbation or interference or anomaly), and measuring or monitoring the response time that elapses until the user reacts to such perturbation. For example, the perturbation generator module 207 may cause the mouse-pointer to entirely disappear, on both the victim's computer screen and the remote attacker's computer screen, via a suitable command or operating system procedure or function or script; a local (genuine) user may immediately react to such disappearance of a mouse-pointer (or cursor), via one or more suitable reactions (e.g., may move his mouse in a circle, or may move his mouse sideways back-and-forth, or up-and-down; or may press the Escape key, or may perform hectic mouse movements); whereas a remote attacker or a RAT-based attacker may suffer from some degree of latency in communication, due to his being remote, and thus the remote attacker would react to such disappearance later or significantly later than a local (genuine) user would react. The system may thus utilize such injected GUI-based (or other types of user experience) interferences, as a trigger for measuring the latency in user response or the latency in user reaction; a greater latency (e.g., relative to previous measurements, or relative to a threshold value) may indicate that the user is a remote attacker or a RAT-based attacker; while a shorter latency (e.g., relative to previous measurements, or relative to a threshold value) may indicate that the user is a local (genuine) user and not a remote attacker.

Optionally, the system may create user-specific profiles which may comprise cognitive and/or behavioral user-specific traits, based on aberrations or discrepancies that may be based on (or related to) cognitive bias, in order to identify possible identity theft, fraudster, "man in the browser" attacker, and/or non-human ("bot") module impersonating a human user. Such user-specific traits may be extracted by utilizing, for example, priming, Stroop effect, bias of free choice, false fame effect, or the like. For example, a cognitive bias estimator 233 may be used to trigger, and measure or estimate, cognitive bias or user(s) for purposes of differentiating between a genuine or local user, versus a remote user or remote attacker or RAT-based used. In a demonstrative example, the perturbation generator module 207 may introduce a GUI-based perturbation only at a log-in screen of a service or application or website; for example, causing the mouse-pointer to move in a certain deviated manner relative to the hand-movement of the user. A genuine (local) user may have cognitive bias, and may operate his local mouse device in a way that "corrects" the mouse-pointer deviation in the log-in screen. In the next or subsequent screen, the perturbation may not be maintained by the system, or may be removed by the system; a local (genuine) user may still have some degree of cognitive bias, and may still operate the mouse (at least for a short period of time, e.g., 1 or 2 or 5 seconds) in the previous "corrective" manner that he did in the log-in screen. In contrast, some types of remote attackers, or RAT-based attackers, may not operate prior to the logging-in of the genuine user, or may start operating only after the genuine user logged-in; and such remote attacker would not be aware of any log-in screen perturbation that had occurred, and would not have any cognitive bias, and would not operate his mouse in the "corrective" manner that a biased local user would do. This may allow the cognitive bias estimator 233 to distinguish between a genuine local user and a remote attacker.

Some embodiments may identify man-in-the-browser attacks or session hijacking attacks, based on behavioral and/or cognitive meta-data related to the particular application being used, for example, different response time, different hardware-related behavior, cognitive variance between adjacent sessions, responses to aberrations, cognitive bias, or the like. Some embodiments may utilize biasing, hardware identification, adjacent sessions identification, and/or identification of RAT attacks. In some embodiments, the RAT identification may have an equal error rate (EER) of virtually zero percent when hundreds of users are observed.

In some embodiments, an interaction signal sampling and analysis module may analyze a sample of the signal of the user interaction, the frequency of sampling, the types of noise of the sample, channel estimation, response time to aberrations, diluted mouse trajectory samples, first order hold sampling of mouse trajectory, or other user-specific traits which may be extracted or analyzed when two users (human and/or non-human) generate a signal corresponding to user-interaction at different times and at different sampling rate. For example, sampling of mouse movement of a remote attacker's mouse, may be different from sampling of mouse movement of a local (genuine) user.

In a first example, in a remote communication session the communication protocol attempts to reduce communication overhead, and thus may sample less mouse-movement points or may sample the mouse movement at a lower (or reduced) frequency, relative to a local system that does not have communication limitations; and as a result, the mouse movement of a remote attacker, when sampled, may show a less-smooth movement or a more "noisy" or noise-affected movement, whereas sampling of a mouse movement of a local user would show a smooth or smoother movement with less noise; thereby allowing the interaction signal sampling and analysis module to differentiate between a remote attacker and a local user.

In a second example, the remote communication session (of the RAT-based attacker) may suffer from its own limitations, constraints, latency, or its own noises or patterns of noise; which may affect the mouse-movement sampling, and may allow differentiation between the remote attacker and a local user based on such communication noises of the remote access protocol.

In both examples, additionally or alternatively, such "noises" in the remote access protocol may affect the latency (or timing) of user reaction to the injected perturbation, and/or may affect the pattern or other characteristics of the use reaction (e.g., the shape of the mouse movement itself). In some embodiments, optionally, a remote-access burdening module 234 may be used by system 200 in order to intentionally burden or overload the victim's computer resources and/or to burden or overload the remote access protocol (for example, by requiring the victim's computer to upload and/or download large amounts of data from a server controlled by the service being protected, thereby leaving narrower bandwidth and increased latency for the attacker's remote access communication channel); and thereby increasing the effects of such noises due to overloaded communication protocol, or making such communication noise more significant and more observable, and enabling system 200 to detect the remote attacker more rapidly or in a more certain manner.

The user-specific signal characteristics may be stored in the database 203, and may be used subsequently by comparator/matching module 204 in order to compare or match between current-characteristics and previously-estimated characteristics, thereby enabling a decision whether or not the current user is genuine or fraudulent.

Some embodiments may identify man-in-the-browser (MITB) attacks or session hijacking attacks, based on user-interaction data, injection of aberrations, analysis of user reaction, and extraction of parameters that may indicate fraud. In a demonstrative example, a remote attacker may utilize a "Trojan" malware module that is installed on the computing device of the genuine user, when the genuine user is logged-in to the relevant service (e.g., online interface of a bank account). The attacker may thus enter into the account of the genuine user, and may operate therein. Such attack may include, for example, two sessions that take place in parallel or in sequence; operation of the attacker from a remote computer; utilization by the attacker of hardware which may be different from the hardware of the victim's device; and/or utilization of an automatic script which may operate on the bank account (from a remote server, or directly from the victim's device). The terms "RAT" or "Remote Access Trojan" are used herein for demonstrative purposes; and may include other types of Remote Access (RA), remote access via a malware or virus or malicious code, or other types of unauthorized or illegitimate or illegal remote access.

In some RAT attacks, a malware module is installed in a victim's device, and sends or transmits data to a remote computer of the attacker, the data including mouse data as well as screen-shots. Often, to allow a smaller upload of data from the victim to the attacker, images are compressed, or are skipped (e.g., the mouse pointer may be uploaded to the attacker, whereas an underlying background image may be sometimes skipped). The system 200 may utilize an aberration generator 209 to generate one or more aberration(s) that will cause a situation in which the attacker and the victim do not see a visually identical screen, and therefore their reaction would be different and may allow the system to identify the attacker. For example, the aberration generator 209 may generate or inject an aberration or interference, which causes the victim's computer and the remote attacker's computer to show non-identical screens, due to timing difference, latency, bandwidth or throughput limitations (of the connection between the attacker and the victim), due to utilization of different hardware (e.g., different screen sizes or screen resolution) by the attacker and victim, or the like. For example, the mouse pointer may be moved or relocated, to be at different locations; such as, to be in a first location at the victim's screen, while being in a second location at an attacker's screen.

Additionally or alternatively, the upload or transmission channel (to the attacker's device) may be sabotaged, by a channel overloading module 210, such as by creating an overload of data that needs to be uploaded or downloaded or exchanged or transmitted between the attacker and the victim (or vice versa); or by causing a significant delay or latency for the attacker, for example, by sabotaging the ability to efficiently compress image(s), e.g., by broadcasting video (for example, invisibly to the genuine user) or rapidly-changing graphical elements or rapidly-changing content items or rapidly-updating content items. In a demonstrative implementation, data which should not typically be displayed as a video (e.g., text, static image), may be presented as a video or a continuous video clip, to overload a transmission channel which an attacker may utilize for the RAT mechanism. The system 200 may otherwise cause aberrations or intentional discrepancies that may overload the communication channel between the victim device and the attacker device, thereby causing the communication channel to operate in a bursting manner and thus make the attack identifiable.

Optionally, the system may cause the victim's computer to perform an upload at a particular frequency, which may then be identified in the signal of the mouse events of the remote attacker. For example, system 200 may comprise a sampling frequency modifier module 235 which may perform one or more operations which may cause, directly or indirectly, a modification (e.g., a decrease or reduction) in the frequency of the sampling of the input unit interaction of a remote attacker. In a demonstrative example, system 200 may comprise an animation/video burdening module which may present on the victim's computer screen, one or more animation clips and/or video clips of generally static content, such that the victim may not even notice that they are animated or videos; for example, rapid animation or video which switches between two (or more) very similar shades of a particular color that are non-distinguishable to the eye of a typical user. The remote access protocol that is used in the RAT attack needs to transmit the screen content of the victim's computer to the remote attacker's computer; and therefore, the excessive animation/video may burden or overload the remote access communication channel, and may cause a modification of the frequency of the sampling of the interactions of the attacker; and the frequency in which the animation (or video clip) is being animated may affect in a particular manner the frequency of the transmittal of packets from the victim's computer to the remote attacker's computer and/or may affect the sampled signal that represents the interactions of the remote attacker; thereby allowing system 200 to more rapidly or more certainly detect that a remote attacker is interacting with the service.

Some embodiments may extract time-based or time-related parameters which may be user-specific and may be used as user-specific traits for user identification purposes. For example, aberrations or challenges may be generated and injected into an interaction of a user with a service or application or website, which may require a response or reaction from the user (in a visible or conscious manner, or in a non-visible or un-conscious manner, from the user's point of view). An aberration reaction monitoring module 211 may monitor and determine the reaction of the user to introduced aberrations, as well as characteristics of such reaction; for example, was the reaction correct or incorrect, the timing or the latency of the reaction, or the like. Time-based parameters may be extracted, for example, the time period that it takes the user to recognize or discover the aberration and/or to respond to it (or resolve it), the time period that it takes the user to adapt his behavior (e.g., his general mouse movement) to a continuous aberration (e.g., adaptation time, training time), learning curve of the user regarding the aberration (frequency or rate of corrections; magnitude of corrections), or the like. A remote attacker typically has a latency or time-delay, with regard to appearance of the aberration or challenge, as well as different time-based parameters for responding to the aberration or challenge; and this may allow the system to distinguish or discriminate between the genuine user and a remote attacker.

Some embodiments may analyze a sampling signal of the user interaction, for example, sampling frequency (mouse-related, keyboard-related, touch-screen related), types of sampling noises, channel estimates, response time to aberrations, diluted mouse trajectory samples, first order hold sampling of mouse trajectory, or other parameters which may be different from (or may be affected by) parallel operation of two users (e.g., a genuine user and a remote attacker) that generate interaction signals at different times and with different sampling frequencies. Optionally, such features may be extracted in order to estimate or determine the type of hardware utilized by a user, and thereby assist in distinguishing between a local user versus a remote attacker. In a demonstrative example, system 200 may comprise a hardware identification module 236 able to identify hardware utilized by the user and/or able to distinguish between hardware utilized by a remote attacker or a local (genuine) user. For example, each set of hardware components of a computing device, may sample the mouse events at a different frequency and/or with dependence on the available resources (or the overload) of the computer being used. A machine-learning process may be performed in order to allow the hardware identification module 236 to learn the characteristics of the sampling of the mouse events (or keyboard events) of the genuine user, given an average level of computer resources burdening (or availability), which may be known or unknown. In many cases, the remote attacker may utilize a computer or computing device having hardware specifications and/or resources availability that may be different from those of the victim's computer; and therefore, the sampling of the remote attacker's mouse interactions (or keyboard interactions) may be different from that of the local victim's; thereby allowing the hardware identification module 236 to determine that a current user utilizes a mouse (or keyboard) that are different from those that the genuine user had used in previous usage sessions, triggering a possible fraud alert.

In some embodiments, a remote attacker may utilize a remote device (having a remote display unit and a remote mouse and keyboard), which may translate into a relatively low sampling frequency for the user interaction of such remote attacker. Optionally, an aliasing injector module 212 may inject or introduce aliasing operations, which may not be visible or noticeable or significant to a local (genuine) user, but may significantly burden the interaction of a remote attacker. For example, a mouse pointer may be alternately hidden (e.g., at a frequency of 50 Hz), thereby causing the mouse pointer to be visible only to a local user but not to a remote attacker (or vice versa, depending on the exact configuration of such aberration); and the user's response may allow to identify whether the user is a genuine local user or a remote attacker.

In some embodiments, an adjacent session detection module 213 may identify adjacent usage sessions of the attacker and the victim. For example, the system may compare between sessions having a relatively short time interval between them (e.g., five seconds apart, or one minute apart); the system may compare the user interaction parameters of those two sessions, between themselves and/or relative to one or more historic profile(s) or previously-monitored interaction sessions of that user. In some embodiments, the system may analyze the later of the two sessions against the interaction parameters of the earlier of the two sessions, rather than against the historic or general interaction profile of the user. Optionally, the system may generate an ad-hoc profile or temporary profile, per usage session, which may be stored and utilized for a short period of time (e.g., 30 or 60 minutes); optionally, an ad-hoc profile or temporary profile may not necessarily be merged or fused into the general profile of the user; but rather, may be kept or utilized temporarily, while evaluating whether or not the current user is indeed the genuine user or an attacker; and only if the system determines that the current user is genuine, then, his long-term profile may be updated in view of his interactions in the current session.

Some embodiments may identify a fraudulent usage session by training the user to a particular behavior and testing for such behavior; for example, by launching aberrations that cause the user to change its mode of interaction within the next few seconds or minutes and while the aberration is still carried on. For example, the system may change the relation between the physical movement of the mouse and the virtual or on-screen cursor or pointer during the log-in process, and then make another modification subsequent to the log-in process. Similarly, the system may modify the delay time or delay interval between the pressing-down of a key on the keyboard, and the appearance of the suitable character on the screen. The system may generate other, small, aberrations in proximity to a button or link that needs to be clicked or selected, thereby requiring the user to aim the mouse more accurately; or in a touch-screen device, introducing an artificial delay between touching an on-screen key until character appears on the screen, thereby causing the user to prolong or extend the pressing time or touching time. In some embodiments, one of the two sessions may be injected with such aberrations, whereas another of the two sessions (e.g., the later-starting session) may not be injected with such aberrations; and sampling and analysis of input unit events may enable the system to distinguish between a local (genuine) user and a remote attacker.

Some embodiments may utilize a priming messages module 237, such that a message is briefly or instantaneously shown or is flashed on the screen for a very short time in order to convince the user, sub-consciously, to use a first button or interface element instead of a second one. The system may identify a remote attacker or "bot" or malware due to their ignoring of such priming messages, which may not be transferred from the victim's computer to the remote attacker's computer due to limitations of the remote-access protocol or communication channel; or the system may identify a remote attacker since such priming messages may differently affect the interactions of different users (e.g., the genuine user may ignore such priming messages, whereas the remote attacker may obey them; or vice versa).

Some embodiments may detect that a mobile computing device (e.g., a smartphone, a tablet) is being controlled (or was controlled) via a remote access channel (e.g., by a remote attacker who utilizes a non-mobile computing platform, such as a desktop computer or a laptop computer). Some embodiments may detect that a mobile computing device that has a touch-screen and an accelerometer (e.g., a smartphone, a tablet) is being controlled (or was controlled) via a remote access channel by a remote attacker who utilizes a computing platform that lacks an accelerometer (such as a desktop computer or a laptop computer). Some embodiments may detect other scenarios or attacks, in which an attacker utilizes a desktop or laptop computer, in order to remotely access a mobile computing device (e.g., smartphone or tablet).

For example, touch-screen movements and/or gestures and/or taps may be monitored, captured and/or sampled; and may be compared or matched against accelerometer(s) data for the same time-period (or for a time period or time-slot which is at least partially overlapping). The system may detect that the touch-screen event sampling indicates that the user of the mobile device has manually performed gestures on the touch-screen; whereas, at the same time, accelerometer data from the mobile computing device is absent, or is null, or indicates no acceleration and no deceleration. Such mismatch or anomaly may indicate that the mobile computing device (e.g., smartphone or tablet) is or was actually being controlled remotely, by an attacker who utilizes a remote access channel, which enabled the attacker to emulate or simulate "touch-screen gestures" (taps, movements) through the attacker's input unit (e.g., mouse, touch-pad), but did not enable the attacker to affect the accelerometer data that the mobile computing device produces. Some implementations may thus detect that a mobile computing device appears to be performing manual gestures, while the device itself is not physically moving or shaking (even minimally), or while the device itself is at a complete rest; thereby indicating that possibly a remote access attack is or was performed.

System 200 may further comprise an Automatic Script Detector (ASD) module 241, which may be a component or module able to detect an automatic script (or malware, or virus, or Trojan, or "bot", or malicious automated code or program), which may attempt to control a user account (or a subscriber account, or an online account of a genuine user), in an un-authorized or illegal or fraudulent manner. In some embodiments, the ASD 241 may utilize one or more of the functions described above, in order to detect such automatic script, or in order to distinguish or differentiate between a human user (e.g., the genuine or legitimate or authorized human user) and a "bot" or automated script. It is clarified that ASD module 241 may detect, for example, that a malicious or unauthorized automatic script or code is running or is "interacting" artificially or automatically with a computerized service, or is "impersonating" a human user. Naturally, some or most computing devices may run authorized scripts, such as Operating System, drivers, anti-virus programs, authorized background tasks (e.g., backups); and the ASD module 241 is not aimed at detecting such authorized processes, but rather, aimed at detecting unauthorized and/or unknown and/or malicious scripts or code or programs.

Some embodiments may detect an automatic script which may operate as a man-in-the-browser attack (or in a man-in-the-middle attack), and which may modify some or all of the data items that are sent from the victim's computing device to a web-server or application-server; for example, modifying a recipient bank account data, when the genuine user instructs his bank to perform a wire transfer. The system may identify such script or attack, by comparing between the original data that the genuine user had inputted and instructed to send out, to the (modified) data that was actually received at the bank's server. In a demonstrative embodiment, the system may detect that the genuine user had inputted six keystrokes when he types the recipient's name, whereas the recipient's name as actually received at the bank server has other number of characters (not six characters). Some embodiments may further examine patterns of the inputting method, if the number of characters is identical, in order to detect a possible fraud.

In some implementations, the ASD module 241 may comprise or may utilize an interaction data correlator 242, able to correlate or match or compare between: (a) data indicating that a transaction was commanded or ordered or requested from the user's side, and (b) data indicating user-interface interactions (e.g., mouse-clicks, mouse gestures, mouse movements, keyboard keystrokes, touch-pad events, mouse events, keyboard events, other input-unit events). For example, the ASD module 241 may be connected to, or associated with, an online banking application or web-site or service; and may monitor interactions of the user with that service. The ASD module 241 may detect that the online banking service reports that the user commands to perform a wire transfer (e.g., without necessarily receiving from the banking service a copy of the actual data, such as, without receiving the data of the beneficiary name, the beneficiary account number, the amount of wire transfer, or the like). Upon such report or trigger from the online banking service, the ASD module 241 may check whether or not any input-unit interactions were received from the user's device, for example, in a particular recent time-period (e.g., in the most-recent 1 or 2 or 5 or 10 minutes). For example, the interaction data correlator 242 may detect that even though a wire transfer was commanded or requested from the user's side, the GUI or UI interactions or the input-unit interactions do not show any input or any gestures or dynamics in the past 5 minutes; and therefore, the interaction data correlator 242 may determine that the commanded wire transfer was not entered by a human user, but rather, might possibly have been submitted automatically by an automated script or a "bot" program which automatically and electronically submits form data without moving the mouse and/or without typing on the keyboard. The interaction data correlator 242 may thus trigger an alarm or alert notification for possible fraud.

In another implementation, the interaction data correlator 242 may further correlate or compare or match, between (a) meta-data about the input-unit interactions that were actually performed, and (b) meta-data about the data that the banking service has received as part of the banking command. In a demonstrative example, an automated script may manipulate or modify or replace data that a human (genuine) user typed, and may submit the modified or fraudulent data to the banking service in lieu of the correct data that the human user has entered manually. For example, the human user may use the keyboard to enter a first beneficiary name of "John Smith" (having 10 characters, including the Space), and having an account number of "12345678" (having 8 digits), and having a beneficiary city address of "Miami" (five characters); whereas, the automated script may manipulate or modify or replace the user-entered data, after the user typed it but prior to its electronic submission to the banking service's server, to a second beneficiary name (such as "David Malcolm", having 13 characters), having an account number of "1234567" (having 7 digits), residing in a city of "Moscow" (having 6 letters). The interaction data correlator 242 need not receive from the banking service the actual data of the wire transfer details; rather, the interaction data correlator 242 may receive only the meta-data describing the data, such as, that the wire transfer request is to a beneficiary name having 13 characters, to a bank account having 7 digits, and to a city having 6 characters. The interaction data correlator 242 may inspect the recently-captured user interactions (e.g., keystrokes, mouse dynamics, mouse events, keyboard events, other input-unit events) and may determine that the command meta-data does not match the user-interactions (or the user interaction meta-data); because, the beneficiary name in the wire request has 13 characters, but the interaction data correlator 242 does not observe a series of 13 characters entered within a short period of time (e.g., within 4 seconds) as a separate batch from other data; or because the interaction data correlator 242 observes an initial batch of 10 characters entered rather than 13 characters. The interaction data correlator 242 may thus determine or deduce that an automatic script or "bot" has possibly intervened to manipulate, replace or modify the data that the user entered manually, with fraudulent data whose meta-data does not match the meta-data of the user interactions; and the interaction data correlator 242 may proceed to generate an alarm or alert notification of possible fraud.

In some implementations, the interaction data correlator 242 may optionally monitor and analyze the grouping of characters into "fields" or "batches", and not only the total number of keystrokes or characters; by using a grouping analyzer 243. For example, the genuine user may enter "John Green" and also "Boston", totaling 16 characters; and the automated script may fraudulently replace them with "David Green" and "Miami", which are also totaling 16 characters. The interaction data correlator 242 may perform grouping into batches, and may notice that the manual input that was received corresponds to: a first batch of 10 characters, followed after ten seconds by a second batch of 6 characters; whereas, the data in the wire command (as manipulated by the automated scripts) corresponds to batches of 11+5 characters, and thus does not match the grouping or batching of the manual user interactions; thereby triggering an alert notification for possible fraud.

In some implementations, the interaction data correlator 242 may utilize a hash/checksum module 244, in order to compare or match or correlate between hash values and/or checksum values of (a) data that the banking service indicates as being received from the user, and (b) data reflecting the monitoring of user interactions through the input unit(s); and without necessarily receiving from the banking service the actual data of the banking order. For example, the banking service may indicate to the interaction data correlator 242 that a wire transfer command has been received, with a beneficiary name having ten characters and having a checksum of a hash-value of "54321". The interaction data correlator 242, in conjunction with the checksum module 244, may check whether any recently-entered group or batch of ten characters, as captured from monitored user interactions, has a checksum or hash-value of "54321"; and may generate a possible fraud alert if such match is not detected.

In some implementations, a keystrokes spacing module 245 may be used to detect anomalies or fraud based on expected or observed gaps in keystroke entry. For example, an automated script may input data by emulating a fixed-rate typist which types at a generally fixed rate (e.g., one character every second; or one character every half-a-second); whereas, a human user may not have a fixed time-gap among keystrokes. Furthermore, some automated scripts may attempt to insert random or pseudo-random time-gaps between emulated keystrokes, to create an impression of a human user typing (rather than an automated script). However, a human user typically enters certain groups of keystrokes more rapidly and/or with reduced time-gaps (or with almost no time gaps), and this may be used by the keystrokes spacing module 245 to differentiate between (i) a human user, and (ii) an automated script which enters characters in a synthetic or artificial manner "impregnated" or augmented with pseudo-random time-gaps. For example, a first user may type the common suffix "tion" (as in "question", "motion"), rapidly and with very little time-gaps among characters; or may type the common prefix "re" (as in "recall", "remove") or the common sequence "the" (as in "the", "there", "them") more rapidly or with very little time-gaps among characters; whereas an automated script may enter characters with fixed or pseudo-random time-gaps or intervals that do not correspond to the user-specific spacing or no-spacing while typing manually certain keystroke sequences. These properties may be monitored and analyzed by the keystrokes spacing module 245; and may be utilized in order to distinguish or differentiate between (a) a human user, and (b) an automated script; and/or may be utilized in order to distinguish or differentiate between two human users (e.g., a genuine or legitimate user, versus a fraudster or imposter or attacker or hacker).

System 200 may further comprise a Code Injection detector 246, able to detect a fraudulent or possibly-fraudulent situation in which a code or program or script is injected or added to a website or application or service; for example, able to detect an HTML injection attack. In a demonstrative example, a malware or virus or Trojan is maliciously installed on a computing device or electronic device of a genuine user; who then access a particular service or website or application (e.g., banking, electronic commerce). The server of the accessed service (e.g., banking web-server) sends to the user's device an HTML page, which requires the user to enter a username and a password. The malware on the user's computer intercepts the received HTML code prior to its rendering in the browser; and the malware then modifies, manipulates, replaces and/or augments the HTML code. For example, the malware may inject or add to the original HTML code (that was received from the bank's web-server) additional HTML code ("injected code"), which also requires the user to enter her social security number, and/or to answer a security question (e.g., place of birth), as part of a fraudulent, modified, log-in page which is then rendered and displayed to the user by the web-browser. The malware may then capture the additional data that the user enters and/or submits, while transmitting back to the web-server only the data for the originally-required fields (the username and the password) and not the augmented (fraudulent) fields.

The code injection detector 246 may capture such code injection, for example, by monitoring and analyzing the data or meta-data related to user interactions with input unit(s) (e.g., keystrokes, mouse clicks, mouse gestures, mouse events, touch-pad events).

In a first example, the code injection detector 246 may receive from the bank web-server an indication that a form was sent to the user's device for filling and submitting by the user, and that the form (as sent from the web-server) contains two fields to be filled-out. The code injection detector 246 may then detect that the monitored user interactions indicate clearly that the user has filled-out three fields rather than two fields; for example, because the user has entered a sequence of 10 characters (possibly his username), then pressed Tab to move to a second field, then entered a sequence of 12 characters (possibly his password), then pressed Tab again to move to a third field, then entered a sequence of 9 characters (possibly his social security number, or any other third data-item other than the two that the bank web-server requested to be filled-out). The code injection detector 246 may thus determine that possibly a code injection attack is being carried out by a malware component; since the web-server of the service indicates that two fields have been requested to be filled-out, whereas the actual monitored user interactions indicate that three (or more) fields have been filled-out manually by the user.

In a second example, the code injection detector 246 may utilize data or meta-data about the length of field(s) that are expected, compared with actual number of characters typed. For example, the bank web-server may indicate to the code injection detector 246, that two fields are expected to be filled-out; a username field which is limited to 16 characters, and a password field that is limited to 20 characters. The code injection detector 246 may observe the actually-typed or actually-performed manual interactions, and may detect that the user has typed a string with a length of 45 characters; thereby indicating that possibly a third field (or additional fields) have been fraudulently "injected" into the HTML code by a malware and have fraudulently induced the user to type excessive number of characters than expected.

System 200 may further comprise a hardware assembly detector 247 able to determine one or more properties of the hardware components that are actually used by a user of a computing device, based on analysis of user interactions (e.g., keystrokes, mouse gestures, mouse events, mouse clicks, touch-pad events, and/or other input-unit events or interactions).

In a first example, a stroke evaluator module 248 (which may also be referred to herein as a long-stroke evaluator module) may be used in order to evaluate or analyze long strokes that the user performs. For example, the long-stroke evaluator module 248 may monitor and may evaluate all the strokes (or gestures) in which the user moves the on-screen pointer (e.g., mouse-pointer, arrow-shaped pointer, cursor, or the like); or the top K percent (e.g., top 5 percent or top 10 percent) of the strokes when ordered based on their length in descending order. The long-stroke evaluator module 248 may detect, for example, that in a first usage session on Monday, the ten longest strokes that the user performed have moved the pointer by 600 to 700 pixels, thereby indicating that a mouse device was used on a flat surface with a long stroke; whereas, in a second usage session on Tuesday, the ten longest strokes that the user performed have moved the pointer by 250 to 300 pixels, thereby indicating that a touch-pad was used in that usage session. Accordingly, evaluation of the long or longest strokes of the user, may indicate on the type of hardware that the using is utilizing; and may allow the long-stroke evaluator module 248 to distinguish or differentiate between a user utilizing a mouse device and a user utilizing a touch-pad.

Additionally or alternatively, the long-stroke evaluator module 248 may detect that in the second usage session, two or three consecutive strokes of approximately 250 pixels each, where performed consecutively with short time-gaps between them (e.g., less than a second, or less than half-a-second), indicating that the user possibly utilized a touch-pad with three consecutive horizontal strokes in order to entirely move the on-screen pointer from the left side of the screen to the right side of the screen.

In another example, some laptop computers may include a mini-joystick in the center of their keyboard, also known as a "pointing stick" (e.g., having a red rubber tip); and the utilization of such keyboard-based pointing-stick may leave a distinguishable footprint on user interactions; for example, may manifest such utilization by shorter strokes that are more "bursting" in their nature, or have a greater initial acceleration, or have a greater ending deceleration, or the like. The long-stroke evaluator module 248 may monitor long-strokes (or strokes in general, not necessarily long ones) in order to detect such typical footprint or pattern that is indicative of a keyboard-based pointing-stick; and may thus distinguish or differentiate between (a) a user utilizing a keyboard-based point-stick, and (b) a user utilizing other type of input unit (e.g., touch-pad, mouse).

System 200 may further comprise a sampling-based detector 249 able to differentiate between types of input units (e.g., mouse, touch-pad, pointing-stick), and/or even between different input units of the same types (e.g., different types of mouse devices), based on different sampling footprint or sampling characteristics that such input devices may have, individually or due to their assembly with other specific hardware components.

In a first example, monitoring the utilization of a mouse device may lead to a first type of sampling distribution or standard deviation thereof or sampling frequency thereof; which may be different from those obtained from monitoring the utilization of a touch-pad, or a pointing-stick. Accordingly, the sampling-based detector 249 may determine, based on differences in the characteristics of the sampling of the input device, that a first input device is currently utilized, whereas a second input device had been utilized in a previous usage session of the same purported user.

In a second example, mouse devices made by a first manufacturer (e.g., Logitech) may have different sampling characteristics (e.g., frequency, distribution, standard deviation) than corresponding characteristics of mouse devices made by a second manufacturer (e.g., HP); thereby allowing the sampling-based detector 249 to determine that a current user is utilizing a mouse from a different manufacturer, compared to a mouse utilized in a previous usage session of that user.

In a third example, a cordless or wireless mouse may have different sampling characteristics (e.g., frequency, distribution, standard deviation) than corresponding characteristics of a corded mouse; thereby allowing the sampling-based detector 249 to determine that a current user is utilizing a wireless or cordless mouse, in contrast with a corded mouse that had been utilized in a previous usage session of that user (or vice versa).

In a fourth example, various models of the same type of mouse (e.g., cordless, or corded) may have different sampling characteristics (e.g., frequency, distribution, standard deviation), for example, due to different technical specifications of such different mouse devices (e.g., different physical dimensions; different resolution; being a left-handed or right-handed or neutral mouse device; or the like); thereby allowing the sampling-based detector 249 to determine that a current user is utilizing a mouse model which is different from a mouse model that had been utilized in a previous usage session of that user (or vice versa).

System 200 may further comprise a keyboard identification module 250, able to distinguish or differentiate among keyboards based on user interactions via such keyboards. For example, rapid typing of a certain sequence of characters (e.g., "tion" or "the") may be indicative of an English keyboard being utilized; whereas, rapid typing of other sequence of characters (e.g., "ez" which is a frequent verb suffix in French) may indicate that a French keyboard is being utilized. Similarly, Russian keyboard, Chinese keyboard, and other keyboard layouts may be detected, by observing and detecting particular rapid sequences of characters that are typically entered in certain languages and not others; regardless or independently of (and sometimes in contradiction to) the estimated geographical region that may be (correctly or incorrectly) deduced from the Internet Protocol (IP) address of the user.

For example, a genuine user may be located in the United States and may utilize an American English keyboard layout; but a remote attacker located in Russia may take control over the genuine user's computer in order to access a bank account of the genuine user. The bank web-server may only "see" the U.S.-based IP address of the genuine user, and may thus assume or determine (incorrectly) that the service is being accessed by a person located in the United States; however, the keyboard identification module 250 may observe one or more rapid key sequences that are indicative of a non-English/non-U.S. keyboard layout, and may alert the banking system that a possible fraud may be occurring, even though the IP address of the logged-in user indicates a U.S.-based IP address.

In another example, different keyboard layouts may dictate, or may be indicative of, different speed or rate of typing (in general, or of various words or syllables or sequences); and these parameters may be monitored and evaluated by the keyboard identification module 250, and may allow to distinguish or differentiate among users based on the estimated type of keyboard layout that is being utilized in a current session, compared to historical or past keyboard layout(s) that were observed in prior usage sessions.

Optionally, the hardware assembly detector 247 may utilize a resources burdening module 251 for the purposes of hardware assembly detection or identification. In a demonstrative example, a web-page or application of a service (e.g., banking service, or electronic commerce service) may intentionally include excess code, whose purpose is to execute a resource-intensive operation or calculation (e.g., a function that finds all the prime numbers between 1 and 1,000,000); and the user's device may be induced into executing such code (e.g., as a client-side JavaScript code or other client-side program) when the user is accessing the service, in order to capture and use the footprint of such resource burdening. For example, each time that a user logs-in to his banking website, the website may require the user's device to execute (e.g., one time only per each log-in session) a particular resource-intensive user-side (e.g., browser-based) calculation, and to transmit or submit the answer back to the server. The resources burdening module 251 may observe that, for example, in a first usage session the client-side computation required 13 seconds; in a second usage session the client-side computation required 13.3 seconds; in a third usage session the client-side computation required 12.8 seconds; and in a current, fourth, usage session the client-side computation required only 8 seconds. This may indicate that the current usage session is being performed by utilizing a different hardware (e.g., faster processor; increased memory) relative to the previous usage sessions, and may indicate that a possible fraud may be taking place (e.g., by a hacker, a remote attacker, or other fraudster). Optionally, such determination of possible fraud may be reached, even if the IP address and/or "cookie" information indicate that the current user is the same person (or the same device) as the user of a previous usage session.

Optionally, the keyboard identification module 250 may operate in conjunction with, or in association with, a cognitive-based/non-biometric segmentation module 296, which may be able to estimate that a user is located in a particular geographic region (e.g., continent, country) and/or that the user is fluent or knows how to write a particular language (e.g., a particular non-English language); based on cognitive parameters which may be estimated or determined.

Some embodiments may perform non-biometric segmentation of users based on cognitive behavior. For example, the system may estimate the geographic or geo-spatial location of the user, based on an analysis of the key-typing by the user, which may indicate that a particular keyboard layout (e.g., Russian keyboard layout) is being used, thereby indicating a possible geographical location (e.g., Russia or the former Soviet Union). Some implementations may utilize a CAPTCHA challenge which may require typing of local or region-specific or non-universal characters, thereby indicating a possible geographic location of the user.

Some embodiments may utilize non-biometric segmentation of users based on user interaction characteristics, in order to identify possible attackers or fraudsters. The way that a user interacts with a computing device or website or application, may be indicative of a geographic location of the user, a primary language that the user masters or uses, an age or age-range of the user (e.g., relatively young age between 15 to 30, versus senior citizens over 60), level of computer-proficiency or computer-literacy of the user, or the like. These features may be extracted for each usage session, may assist in creating a user-specific profile, and may be used for detecting a potential attacker.

In a first example, geographic or geo-spatial features may be extracted, and may then be used for identifying a possible attacker located in Asia and who attempts to compromise an account of a United States user or service. In a second example, age-related features may be extracted and may be used for identifying a possible attacker who is relatively young (under 30) and attempts to compromise an account of a senior citizen (over 60). In a third example, some younger or computer-proficient users may utilize certain keyboard shortcuts (for example, CTRL-V to paste text), whereas a senior citizen may not be proficient with such keyboard shortcuts, or may not use them at all, or may even use Menu commands (e.g., Edit/Paste) to perform similar operations; thereby allowing to raise a flag or alert if an account of a senior citizen, who did not user CTRL-V in the past, suddenly detects such usage.

Some embodiments may estimate the geographic or geo-spatial location of a user, based on an estimate of the keyboard layout of that user by analyzing keystroke patterns or other keystroke information; for example, identifying strings of two or three characters, that are typically typed quickly in first keyboard layout of a first region, but are typically types less-quickly or slowly in a second keyboard layout of a second region. For example, the word "wet" may be typed quickly in a standard QWERTY keyboard in the United States, but may be types slowly in a keyboard having a different layout in which the letters of the word "wet" are not adjacent. Similarly, when typing the word "read", a partial string of "re" or "rea" is typically typed faster in some United States keyboard layouts, relative to the remaining portion of the word; and this may be different in other keyboard layouts. The system may track the keystroke patterns, of whole words, or of two-character or three-character or four-character strings, and may utilize such patterns for distinguishing between a genuine user and an attacker, or for determining whether a current user appears to be utilizing a keyboard having a different layout from the keyboard layout of a genuine user who logged-in previously or historically.

Some embodiments may similarly utilize other input-specific combinations in order to distinguish between users, for example, utilization of keyboard shortcuts and/or menu commands, or utilization of a combination of keyboard and mouse (e.g., clicking a mouse button while holding the Shift key or the CTRL key); such advanced combinations may be more typical of a younger user (e.g., age of 15 to 30), rather than a senior citizen user (e.g., age over 60). Similarly, the utilization of Caps Lock or Num Lock or other "shifting" keys (e.g., the Windows key, or a FN function key in a laptop keyboard), may be indicative of a younger or more-proficient user, and may be used for raising a flag or initiating a fraud alert when such user attempts to handle an online account of a senior citizen.

In some embodiments, a CAPTCHA that requires to type local or region-specific characters or language-specific characters may be displayed to the user, in order to further assist in distinguishing among users or for extracting geographic data or keyboard layout data. In a demonstrative example, a web server or application server located in France, typically serving French users and customers, may display a CAPT- CHA string of "prêt à porter", in which two letters have accents (or "diacritical marks" or "diacritic marks") on top of them (or under them, or near them); a user that masters the French language and/or utilizes a keyboard (hardware keyboard, or on-screen keyboard) having a French layout would probably type correctly either two or one of those accented characters (with their accents, or with their diacritical marks); whereas a non-French person, or a person utilizing a keyboard that does not have a French layout, would probably type without any accents or diacritical marks, "pret a porter".

System 200 may further comprise a user-age estimator 252, able to estimate an age or an age-range or age-group of a user of an electronic device, based on monitored interactions of the user with input unit(s) of the electronic device. Additionally or alternatively, a user expertise estimator 253 may estimate whether a user of an electronic device is a novice user or an expert user; or whether the user is experienced or non-experienced in operating electronic devices and/or in accessing online systems.

In a first example, the typing speed on a keyboard may be monitored and analyzed; rapid typing speed may indicate that the user is relatively young (e.g., between the ages of 15 and 40, or between the ages of 18 and 30), and/or may indicate that the user is an expert or experienced. In contrast, slow typing speed may indicate that the user is relatively old (e.g., over 60 years old; over 70 years old), and/or that the user is non-experienced or novice. Optionally, threshold values (e.g., characters-per-second) may be utilized, with regard to the user's typing, in order to estimate the user's age or age-range, or the user being expert or novice.

In a second example, the user-age estimator 252 may take into account whether or not the user utilizes advanced options for inputting data. For example, utilization of "copy/paste" operations may indicate a younger user or an expert user; whereas, repeated typing (even of duplicate information, such as mailing address and shipping address) and lack of using "copy/paste" operations may indicate an older user or a novice user. Similarly, utilization of various "keyboard shortcuts" in a browser or an application, may indicate a younger user or an expert user; whereas, lack of utilization of "keyboard shortcuts" in a browser or application may indicate an older user or a novice user.

In a third example, the general efficiency and/or speed of the user in completing a task may be monitored and may be taken into account by the user-age estimator 252 and/or by the user expertise estimator 253. For example, if it takes the user around 60 or 90 seconds to complete all the information required for a wire transfer, then the user may be classified as a younger user and/or an expert user. In contrast, if it takes the user more than 6 minutes to complete all the information required for a wire transfer, then the user may be classified as an older user and/or a novice user.

Some embodiments may distinguish between an expert user and a novice user, or between a technology-savvy user and a common user, based on tracking and identifying operations that are typical of such type of user. For example, usage, or frequent usage, or rapid usage, of keyboard shortcuts or cut-and-paste operations (e.g., CTRL-C for Copy), or using ALT-TAB operations, or performing rapid operations in a short time or at rapid rate, or avoiding usage of menus, may indicate an experienced user rather than a novice user. Utilization of the Tab key for moving among fields in a form, or utilization of the Enter (or Return) key instead of using a "submit" button or a "next" button, may indicate an experienced user. The system may identify that a previous user of an account has typically operated the account with a pattern that typically matches a novice or non-sophisticated user, whereas a current user of the account appears to operate the account with a pattern that typically matches an advanced or expert user; and this may cause the system to raise a flag of alert for potential fraud. Similarly, an attempt to perform a new type or certain type of operation in the account (e.g., a wire transfer; or a money transfer to a new destination or new recipient), together with usage pattern that is indicative of an expert user or sophisticated user, may by itself be a trigger for possible fraud.

The estimations made by the user-age estimator 252 and/or by the user expertise estimator 253 may be compared or match to user data which may appear in a user profile, or may be received from a third party or from the service provider (e.g., the bank web-server); and may be used to trigger a possible fraud alert. For example, the bank web-server may indicate to system 200 that the current user is in the age-range of 70 to 80 years old; whereas the user-age estimator 252 and/or the user expertise estimator 253 may determine, based on analysis of actual interactions, that the current user appears to interact as if he is an expert user or a younger user, thereby triggering a possible fraud alert.

System 200 may further comprise a user gender estimator 254, able to estimate the gender (male or female) of the user of an electronic device, based on analysis of monitored input-unit interactions. In a demonstrative example, most males have short fingernails or non-long fingernails; whereas some females may have long fingernails. Applicants have realized that when a person having long fingernails types on a physical keyboard (having physical keys), there is typically a shorter time-gap between the "key down" and the "key up" events. Some experiments by the Applicants have shown that it may be possible to distinguish between a male user and a female user, with level of confidence of approximately 65 to 70 percent or even higher. The user gender estimator 254 may thus monitor the time-gaps between key typing events, in order to estimate whether the current user is male or female. Such gender estimation may be taken into account by a fraud detection module, in combination with other parameters (e.g., time-gaps in previous usage sessions of that user in the past; the fact that a significant majority of attackers on banking websites or electronic commerce websites are performed by male users and not by female users), and/or in combination with other parameters or data or meta-data received from the service being monitored (e.g., an indication from the bank web-server about the registered gender of the logged-in user as it appears in the user's profile).

Optionally, the gender estimation (and/or other user-specific estimations as described above) may be utilized for triggering a possible fraud alert; or may be used to the contrary, to avoid raising a possible fraud alert. For example, system 200 may estimate that a first user at 10 AM is a novice old male, and that a second user who accessed the same account at 10:15 AM is an expert young male; thereby indicating a possible fraud (e.g., the second user may be an attacker), possibly taking into account the fact that the account indicates only one account-owner. In contrast, system 200 may estimate that a first user at 4 PM is a novice old male, and that a second user at 4:10 PM is a novice old female; and may take into consideration also the fact that this bank account is jointly-owned by a married couple of two senior citizens; thereby allowing the second access session without raising a possible fraud alert.

In some embodiments, an advertising/content tailoring module 255 may utilize the estimations or determinations produced by other modules of system 200, in order to tailor or select user-specific advertisements or banners or promotional content (or other type of content, such as news articles, videos clips, audio clips), tailored to the estimated characteristics of the user. For example, the user-age estimator 252 may estimate that the current user is in the age-range of 18 to 30 years; the user expertise estimator 253 may estimate that the current user is an expert or experienced user; and the user gender estimator 254 may estimate that the current user is a male; and based on these estimations, the advertising/content tailoring module 255 may select or modify a banner ad which suits this segment of the population. Additionally or alternatively, the advertising/content tailoring module 255 may take into account geographic segmentation and/or language segmentation, which may be based on IP address of the user and/or may be based on analysis of monitored user interactions which may allow identification of foreign keyboard layouts and/or foreign languages, thereby allowing the advertising/content tailoring module 255 to further tailor the displayed promotional content based on the additional geographic information and/or language information.

System 200 may comprise a credentials sharing detector 256, for detection, mitigation and/or prevention of credential sharing (e.g., username-and-password sharing, or other cases of "friendly fraud") among two or more users, in which one user is an authorized user or "paying subscriber" who shares his credentials (e.g., for accessing a premium service) with a second user (who is not a "paying subscriber"). For example, John may be a paying subscriber of "Netflix" or other streaming-content provider; or may be a paying subscriber of "NYTimes.com" (newspaper) or of "Lexis.com" (legal information database). The user John (who may be, for example, male, 20 years old, expert user) may share his log-in credentials to such premium subscription service, with his aunt Susan (who may be, for example, female, 60 years old, novice user). The modules of system 200 may monitor user interactions with the service (e.g., in the log-in page, and/or in subsequent pages that the user may browse, access, or otherwise interact with), and may estimate user-specific characteristics based on the user's interactions with the input unit(s), thereby allowing the system to distinguish and/or differentiate between the legitimate user (the subscriber John) and the illegitimate user who piggybacks on the credentials of the legitimate user in order to access or consume premium content without separately subscribing to it.

In some embodiments, the system may detect scenarios of two users using one computing device, in the training phase and/or testing phase. If a user's account is suspected to have multiple users, the system may use unsupervised clustering for separating between users. Afterwards, the system may use separate individual model for each cluster (e.g., each estimated user). This may allow the system to build a combined model, consisted of the individual users' models. This solution may outperform building one model for all users, even though it may require more data as the number of training sessions per user may be decreased. In some embodiments, for example, a joint-account user-profile constructor 257 may be used in order to utilize the estimated differentiation or the distinguishing between two (or more) legitimate, authorized users who have authorization to access the same account or service (e.g., two co-owners of a joint bank account), and may construct two separate user-profiles that reflect the biometric and/or cognitive footprints of each user separately (based on each user's separate interactions with the input unit(s) and/or the system). This may enable the system 200 to differentiate between each one of those legitimate (but separate) users, and a third user which may be an unauthorized attacker. This approach may yield improved and/or more reliable results, relative to a conventional approach which constructs a single user profile based on all usage sessions of a certain service or account, or relative to a conventional approach that does not attempt to distinguish between two legitimate users accessing the same account (e.g., joint account, family account).

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

The system may readily support multiple users per device. The system may approach the problem in two ways: first, identify that two users share the account; then either build separate models for each user, or, if suspicious, generate an alert (e.g., to the bank). Detection of multiple users may happen in two phases: during initial training, or after initial training.

During initial training: if two or more users operate the account during the initial silent period, in which the system learns the user behavior and builds a model, then the system may utilize algorithms to detect this. In case a user's account is determined to consist of multiple humans, the system may use unsupervised clustering for separating between the different users even though a robust profile was not yet built. Afterwards, the system may use separate individual models for each cluster (suspected user). This in turns allows the system to build individual users' models. Some embodiments may utilize 5-10 sessions per user (not per account) to build the model. The system may check to see if any of the users shows typical or specific fraudster behaviors; if yes, then an alert is generated, and if not then the system may deduce that both are genuine and may build a model.

After a model is built for the main user: in such case, a second user starts using the account. The system may alert that this is not the original user, and the system (e.g., a bank's system) may act upon this determination in combination with additional factors (e.g., is the new user conducting suspicious or high-risk activities; are there several account owners on record or a single owner).

For example, one option is to elevate the risk for the account, such that, when the new user conducts a high-risk activity (e.g., paying to a new beneficiary, or registering a new phone number to a service which allows withdrawing cash from ATMs without a PIN), the system may treat such new user as a suspect user.

Another option is to conduct a manual or automated investigation by contacting the main user, ascertaining their identity, and then asking whether a family member may be using the same account. If yes, then this may be reported to the system via case management, and the system may automatically add that new user to the account.

A third option is to assume that as long as the new user is not doing anything risky, and is not identified as a likely fraudster based on their overall usage patterns (e.g., the new user does not appear to operate like expert users, as described above), then the system may determine that the new user is a genuine additional user. In this case the system may automatically build a profile for the new user and assume they are a genuine secondary user, unless follow-up activities do show signs of fraud behavior.

The system may optionally use a profile type in which a combined model is built for the two users (e.g., generating an account profile per account, rather than a user profile per user). The system may thus have, in some embodiments, a single profile for the entire account, and test it by means of cross-validation that it can be used to accept both while rejecting others. Adding this profile to the scoring process might offer some advantages over just building two separate user models.

Detection of multiple users during the training phase may be performed by using a particular algorithm. The system needs to accept training sessions where there are variations between each session (which is the case for the majority of accounts); but the system may also need to spot sessions that are most likely done by another human, although the system has not yet built a robust model.

Figure 4:
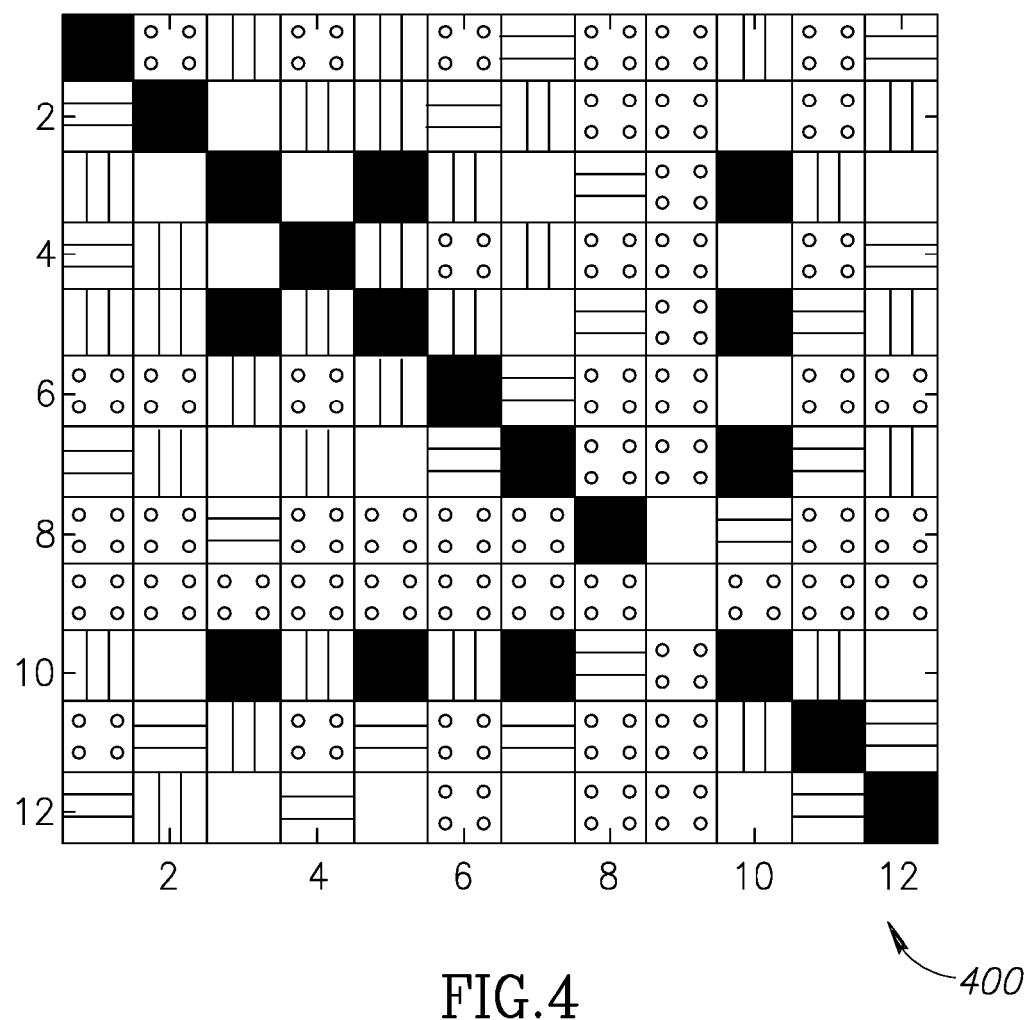
FIG. 4 is a schematic illustration of a confusion matrix (or user-differentiation matrix), in accordance with some demonstrative embodiments of the present invention.

Reference is made to FIG. 4, which is a schematic illustration of a confusion matrix 400 (or user-differentiation matrix) in accordance with some demonstrative embodiments of the invention. For demonstrative purposes and for simplicity, confusion matrix 400 indicates only four different "shades" or fill-patterns; whereas in real-life many (e.g., 10 or 20) shades or colors may be used.

Using a mobile banking simulated environment, a scenario was tested, in which two people operating on the same account produce data. The confusion matrix 400 shows how each user session compares to all other sessions. For example, when comparing the session of User 1 to itself, the result is a deep dark square (highly unlikely to be a different user), as in all "User-K to User-K" comparison (the diagonal dark squares); but in all other comparisons the color is lighter (highly likely to somewhat likely to be a different user). There are some cases where a single user session appears like another single user session (e.g., User-3 session looks like User-5 session); in this case the system might "miss" the detection of the two separate users. Overall detection rate of some embodiments may be around is 95%, at 0% false positive for this test.

In the demonstrative confusion matrix 400: the diagonal black squares are the same user (no mixture), and the off-diagonal squares are mixtures of two users. Each number for both rows and columns represents a single user. The color (or shade) of each square represents a score. The diagonal differs from the non-diagonal items, which means that the system may identify a mix of users in a single account even during the training phase.

Referring again to FIGS. 2A-2B, in some embodiments, the credentials sharing detector 256 may be implemented as, or may be associated with, a "multiple-users for same account" detector 266, which may be able to detect that two (or more) different users are accessing, or are attempting to access, at different times or during overlapping or partially-overlapping time-periods, the same computerized service, using the same user-account (e.g., utilizing the same credentials, username-password pair, or other same data of user authentication). The computerized service may be for example, streaming video service (e.g., Netflix, Hulu), streaming audio service, legal information database (e.g., Lexis.co), news database or website (e.g., NYTimes.com), bank account, a website or application which provides access to digital content to registered subscribes or to paying subscribers or to premium subscribers, or the like.

The two (or more) users, which may be detected, identified, differentiated and/or distinguished from each other by the system, may be, for example: (a) an authorized or genuine user, and an attacker or hacker; or, (b) a first user who is the paying subscriber that received or created the login credentials, and a second user (e.g., his friend or relative) who is not the paying subscriber, and who received the login credentials from the paying subscriber (e.g., a "friendly fraud" situation, or a password-sharing or credentials-sharing situation); or, (c) a first user who obtained the user credentials from any source (and is not the paying subscriber himself), and a second user who also obtained the user credentials from any source (and is not the paying subscriber himself), such as, for example, a mother and a sister of a paying subscriber who both received the login data from the paying subscriber. Other suitable pairs (or groups, or sets) of multiple users, may be differentiated or distinguished and "broken" or divided or separated into the single entities that comprise them.

In a demonstrative implementation of the "multiple-users for same account" detector 266, a first user "Adam" may be a paying subscriber that created or obtained (e.g., legally, lawfully) user credentials (e.g., username and password) for a subscription-based service. Adam shared his user credentials (e.g., possibly in contradiction to terms-of-service of the subscription-based service) with a second user, "Bob". Each one of the two users (Adam, Bob) may be able to access the service, from the same electronic device or from separate (distinct) electronic devices, at various time-slots or time-frames which may be distinct or may even be overlapping or partially-overlapping or simultaneous of partially-simultaneous; by entering the same user credentials.

The system may continuously monitor user-interface interactions and/or input-unit interactions (e.g., performed through a mouse, a keyboard, a touchpad, or the like), of users accessing that particular computerized service, including (but not limited to) the interactions performed by users (Adam and/or Bob) who used the user-credentials of Adam, as well as interactions performed by other users of that particular computerized service that are not related or connected to Adam and/or Bob and who log-in to the service using other credentials.

The system may accumulate data reflecting the interactions of dozens, or hundreds, or thousands of users who access that service; as well as data reflecting the interactions of two or more usage sessions in which Adam and/or Bob (without the system necessarily knowing yet which one of them) has accessed the service with Adam's credentials.

The system may analyze the interactions, or may extract properties and/or attributes of such interactions; for example, distribution of interactions per usage session, standard deviation of sampled data per usage session, average time of usage per usage session, average number of clicks (or keystrokes) per usage session, average time-gap between interactions (e.g., between keystrokes) per usage session, typical reaction (or reactive action, or corrective action) that is performed by a user in response to a user-interface interference that is injected into the usage session, and/or other attributes of each usage session. In some implementation, a usage session may be defined as a time period that begins when a user starts accessing the particular service by starting to enter the login credentials, and that ends upon detecting that a pre-defined time period (e.g., one minute, five minutes, ten minutes, one hour, two hours) has elapsed since the last user interaction was observed for that particular service.

In a demonstrative embodiment, the system may generate numerous Cross-Account Pairing Scores for pairs of usage sessions. Firstly, the system may generate pairing scores for two usage sessions that are not for the same subscription account, and thus, necessarily (or most probably), were not performed by the same (single) human user. For example, if the paying subscribers of the particular service are Adam, Charlie, David, Even, Frank, and so forth, then the system may generate:

(a) a first cross-account pairing score that corresponds to a combination of: (i) the interactions of the user who utilized the login credentials for "Charlie", and (ii) the interactions of another user who utilized the login credentials of "David";

(b) a second cross-account pairing score that corresponds to the combination of: (i) the interactions of the user who utilized the login credentials for "Charlie", and (ii) the interactions of another user who utilized the login credentials of "Eve";

(c) a third cross-account pairing score that corresponds to the combination of: (i) the interactions of the user who utilized the login credentials for "Charlie", and (ii) the interactions of another user who utilized the login credentials of "Frank";

(d) a fourth cross-account pairing score that corresponds to the combination of: (i) the interactions of the user who utilized the login credentials for "David", and (ii) the interactions of another user who utilized the login credentials of "Eve"; and so forth, with regard to pairs of usage sessions that are known to be originating from pairs of two different users (because they originated from two different login credentials).

Additionally, the system may generate Intra-Account Pairing Scores that reflect the user interactions for pairs of usage sessions that are known to be performed for the same subscription account. For example, if the user account of "Adam" has logged-in three times (three usage sessions), then the system may generate the following pairing scores:

(a) a first intra-account pairing score for the subscription account of "Adam", that corresponds to the combination of: (i) the interactions of the user who utilized the login credentials for "Adam" in the first usage session, and (ii) the interactions of the user who utilized the login credentials of "Adam" in the second usage session;

(b) a second intra-account pairing score for the subscription account of "Adam", that corresponds to the combination of: (i) the interactions of the user who utilized the login credentials for "Adam" in the second usage session, and (ii) the interactions of the user who utilized the login credentials of "Adam" in the third usage session; and so forth with regard to pairs of two consecutive usage sessions that were performed for the same subscription account, for each such subscription account.

It is noted that a "pairing score" may actually be a "grouping score", by similarly grouping together a set of three or four or other number, which may not necessarily be two.

The system may then analyze the cross-account pairing scores, and may (separately) analyze the intra-account pairing scores, in order to detect typical patterns or significant attributes. For example, the system may calculate that cross-account pairing scores have a first value of a particular attribute (e.g., standard deviation, or average, or the like); and that the intra-account pairing score calculated over two particular usage sessions from a particular (same) subscription account have a different value of that particular attribute.

The system may analyze one or more pairs of usage sessions, that are associated with the subscription account of "Adam", compared relative to: (A) pairs of usage sessions of the general population of usage sessions that belong to the same subscription account; and/or, compared relative to: (B) pairs of usage sessions that are known to belong to different users (e.g., cross-account usage sessions). The system may thus determine whether a pair of usage sessions, that were performed with the login-credentials of the subscriber "Adam", were indeed performed by the same single human user (e.g., if the attributes of such pair of usage sessions, are more similar to the attributes of pairs of intra-account usage sessions), or conversely, whether that pair of usage sessions were performed by two different users (e.g., Adam and his friend; or Adam and an attacker), for example, if the attributes of such pair of usage sessions are more similar to the attributes of pairs of cross-account usage sessions.

In a demonstrative example, the system may check whether: (a) a pair of intra-account usage sessions that are associated with the login-credentials of Adam and Adam, is more similar to either: (i) pairs of intra-account usage sessions that are associated with the same login credentials (e.g., a pair of David+David, a pair of Eve+Eve, a pair of Frank+Frank, an average or other parameter computed over multiple such pairs), or is more similar to: (ii) pairs of cross-account usage sessions that are associated with different login credentials (e.g., a pair of David+Eve, a pair of David+Frank, a pair of Eve+Frank, an average or other parameter computed over multiple such pairs).

The system may thus be able to identify that a particular subscription-account is utilized by two different human users, rather by the same single human user; and may generate a suitable notification (e.g., a possible fraud notification; a notification to billing department; a notification to cost-containment department).

The system may be able to identify that a particular subscription-account is utilized by two different human users, rather by the same single human user, without relying on (or without taking into consideration) the Internet Protocol (IP) address associated with each usage session (or each purported user); without relying on (or without taking into consideration) the user-agent data associated with each usage session (or each purported user); without relying on (or without taking into consideration) any "cookie" data or "cookie" file which may be stored or used by the computerized service.

The system may be able to identify that a particular subscription-account is utilized by two different human users, rather by the same single human user, without necessarily building a long-term profile (or any type of user-specific profile) for a particular subscription account; or without having to utilize a "training period" in which the system "learns" the habits or the repeated habits of particular subscribers. The system may commence to detect shared-credentials or multi-users in the same subscription account, without constructing a user profile or a subscription-account profile that spans (or that relies on) three or more usage sessions.

System 200 may utilize visible changes of the UI or GUI or the on-screen experience, optionally utilizing gamification features (in which features or functions are presented in a manner similar to a game or puzzle or similar online activity), in order to identify user(s) or detect possible fraud.

For example, a login process may be subject to gamification by a gamification module 258, such that a user may be required to perform game-like operations (e.g., move or drag items, handle items relative to a virtual on-screen "magnet" in a particular location on the screen, complete an on-screen puzzle, rotate a spindle or on-screen wheels or handles of a virtual vault), and the user's reactions or behavior or interactions may be utilized for identification or fraud-detection purposes.

Some embodiments of the invention may allow a unique way of two-factor (or two-step) authentication or log-in. For example, entry of user credentials (e.g., username, and/or PIN or password or passphrase) may be subject to gamification or may be implemented by utilizing a graphic user interface (GUI) or on-screen interface in a way that captures or recognizes user-specific traits through the way that the user utilizes such interface for entering is credentials. Accordingly, the mere entry of credentials by the user, may be used as a two-factor authentication, such that entry of a correct PIN or password may serve as a first factor, and the way or pattern or behavioral traits or other-specific traits of the way in which the user enters the PIN or password may serve as a second factor.

In a first example, the user may be required to enter a four-digit PIN. An on-screen keypad may be shown to the user, showing ten digits (from 0 to 9), and showing four empty "slots" into which the user is requested to "drag and drop" digits, one digit at a time. The user may drag the four digits of his PIN, to the four respective slots, in the right order. If the four digits dragged match (in their right order) the user's stored PIN, then a first factor of authentication is met. If the way in which the user drags-and-drops the digits onto the slots, matches previously-recorded information that indicates how the user typically performs such GUI operation, then a second factor of authentication may be met.

In a second example, alphabetical characters, or alphanumeric characters, or other characters, may be presented to the user as an on-screen keyboard, and the user may drag characters from it towards slot(s) or a field into which the password or PIN is accumulated; and the system may monitor and utilize both the correct entry of the PIN or password, as well as the manner in which the user utilizes the GUI to achieve such correct entry.

In a third example, as part of a user authentication process or a user login process, digits (or letters, or characters) are shown on rollers which may be similar to a slot-machine; and the user may need to shift or turn or roll such rollers in order to reach a particular digit (or letter, or character) on each roller. The correctness of the PIN, as well as the way in which the user utilizes the GUI to reach the correct PIN, may serve as two-factor authentication.

In a fourth example, the log-in process may include PIN entry as well as performing a simple game-like operation, such as, correctly assembling a puzzle having few pieces (e.g., less than ten pieces). The way in which the user utilizes the GUI to assemble the puzzle, may be used as a factor in user authentication, in addition to the correct entry of the PIN or password value.

In some embodiments, the system may utilize a "training period" of, for example, ten user-authentication sessions, in which the system may monitor and track how the user utilizes the GUI to enter his PIN or password. For example, the system may observe and recognize that the user typically drags a first digit of his PIN in a straight short diagonal line, then he drags a second digit of his PIN in a long curved line, or the like, then he pauses a little longer before dragging the third digit, and so forth. The system may generate a user-specific profile that corresponds to such user-specific insights. Subsequently, when the user again logs-in, the system monitors the correctness of his PIN as well as whether the manner in which the user enters his PIN matches his previously-generated profile of GUI utilization, as a two-factor authentication scheme. In some embodiments, if the current manner of GUI utilization does not match the previously-determined user-specific profile of GUI utilization, then the system may declare that the user failed to authenticate, or that a possible fraud exists.

In some embodiments, the present invention may be used to facilitate a process of PIN-reset or password-reset. For example, a PIN-reset process may require the user to enter his current PIN, both by entering the correct PIN value as well as (without the user necessarily knowing) in the particular GUI-utilization manner that matches his user-specific profile. If both factors are met, then PIN-reset may be enabled, without the need to utilize a complex process in which the user is also contacted by phone or by email.

In some embodiments, a tolerance-for-mistakes modification module 259 may be utilized to increase (or decrease, or modify) the system's tolerance for mistakes (or failed attempts) made by the user in an authentication process. For example, a demonstrative system may allow three consecutive failed attempts in logging-in, and may then "lock" the account and may require that the user (e.g., a bank customer) to call a customer service number for further handling. However, if the present invention is utilized, some embodiments may recognize that although three failed log-in attempts were performed, they were all performed in a GUI-utilization manner that closely matches the previously-stored user-specific profile of GUI utilization; and therefore, the system may become more "forgiving" and may allow such user one more (or a few more) log-in attempts before "locking" the account or putting the process on hold.

In some embodiments, the system may periodically update the user-specific GUI-utilization profile, based on the ongoing utilization by the user. For example, the user may start utilizing the system on January 1st, and the system may utilize ten log-in sessions, performed in January, for generating an initial user-specific profile of GUI utilization. The system may proceed to utilize the generated profile, during 25 subsequent log-in profiles of that user, in the months of February through June. The system may continue to update the user-specific profile, based on log-in sessions as they take place. Optionally, the system may discard historic data of GUI-utilization (e.g., in a First-In-First-Out (FIFO) order), since, for example, a user may change the way he utilizes the GUI over time, due to learning the system better, becoming more familiar with the system, getting older in age, or the like. In some embodiments, the system may continuously update the user-specific profile of GUI utilization.

Some embodiments may a login process which may comprise one or more challenges to the user, that the user may not be aware of, or that the user may perform without being aware that the system is checking additional parameters about the user (other than the user's credentials, e.g., username and password).

In a first demonstrative example, a Visual Login module 262 may generate and display an on-screen user interface which requires the user to perform on-screen operations in order to log-in to a service, such that the on-screen operations to be performed by the user may require the user to perform input-unit interactions (e.g., mouse-clicks, mouse movement, keystrokes, or the like) that may be monitored by the system, and such that user-specific traits may be extracted from such input-user interactions, with or without introducing (or injecting) an interference to the on-screen log-in process or to the user experience of the visual login process.

In a more particular example, the Visual Login module 262 may present an on-screen interface showing an on-screen keypad (or keyboard) and a "target" zone (or field, or area); and the user may be requested to drag-and-drop digits (or letters, or character), one by one, in their correct order, from the on-screen keypad (or keyboard) to the target zone, thereby filling-in the user's credentials (e.g., username, password, PIN, or the like). The system may monitor the way that the user drags-and-drops the on-screen items (e.g., digits, letters, characters) from the on-screen keypad (or keyboard) to the on-screen target zone; and may extract user-specific traits from such interactions. For example, a first user may drag a particular digit (e.g., the first digit in his PIN; or the digit "4") in a straight or generally-straight line, whereas a second user may drag that particular digit in a curved line, or in a line having certain attributes (e.g., counter-clockwise direction), or the like. The system may store, in a user's profile or record, data indicating the user-specific trait that was extracted from those interactions; as well as other suitable parameters which may be extracted or computed based on the sampling of the input-device interactions during such Visible Login process (e.g., average time or speed associated with the login process; indicative pauses between entry of particular characters, or before or after entering a particular character; or the like). In a subsequent login process, the extracted user-specific traits may be utilized for differentiating or distinguishing between a first user and a second user; or between a genuine (legitimate) user and a fraudster (or unauthorized user).

In another example, the Visual Login module 262 may operate in conjunction with one or more interference(s), which may be introduced or injected to the visual login process. For example, the Visual Login module 262 may introduce a randomly-selected interference (e.g., selected pseudo-randomly from a pool of several or numerous pre-defined types of interferences), or may introduce a pre-defined interference or set of interferences. For example, when the user drags the second character from the on-screen keypad to the on-screen target zone, the on-screen dragged character may suddenly appear to be "stuck" for three seconds, or may appear to "jump" 200 pixels to the left side of its current location; and the system may monitor the user's reaction to such interference(s), e.g., how long it takes the user to notice the interference and/or to take corrective actions, which type of corrective action the user takes (e.g., shaking the mouse unit sideways, or spinning the mouse-device clockwise, or clicking the mouse several times), and/or other attributes or parameters of the specific corrective action (e.g., if the user shakes his mouse unit, for how many times is it shaken, or the direction of shaking, or the direction of rotation, or the like). In a subsequent login process, the extracted user-specific traits may be utilized for differentiating or distinguishing between a first user and a second user; or between a genuine (legitimate) user and a fraudster (or unauthorized user); for example, by injecting the same type of interference to the accessing user, and by monitoring whether or not the current user's reaction to the interference matches the previously-extracted user-specific traits.

Some embodiments may utilize other types of on-screen visual login process, which may not necessarily involve drag-and-drop operations. For example, an on-screen "vault" may be displayed to the user, with wheels or bolts or cylinders that the user may be required to spin or to rotate (e.g., with one or two or three fingers on a touch-screen), in order to enter a combination which corresponds to the user's PIN. Other types of challenges may be used, optionally having game elements or game-like elements, and optionally hiding from the user the fact that the system may implicitly track user-specific patterns of interactions as part of authenticating the user.

Some embodiments may thus allow or enable the system to perform an implicit Two-Factor Authentication (TFA) process (or two-step authentication process), without the explicit knowledge of the user. For example, the implicit TFA process may combine a first factor ("something you know") with a second factor ("something you have"), such that, for example, the first factor may be the user's knowledge of his PIN or password (e.g., the entered password or PIN matches the previously-defined PIN or password of that user); and the second factor may be the user's particular way of handling of the input-unit, either as general handling, or as a particular handling in response to an interference injected to the login process. The system may thus implement TFA without requiring the user, for example, to utilize a token device for generating a one-time password, or without requiring the user to receive a one-time password via text message or email message or voice message; and without even the actual knowledge of some users that the authentication process is actually an implicit TFA process.

In some embodiments, the visual login (or visible login) process may be implemented by utilizing one or more of the following:

(1) Drag-and-drop of digits or letters or characters, from an on-screen keypad or keyboard, to an on-screen target zone, while monitoring user-specific interaction patterns, without injecting a user-interface interference, and/or in response to an injected user-interface interference.

(2) Rotating or spinning of on-screen "vault" elements or cylinders in order to enter a PIN, while monitoring user-specific interaction patterns, without injecting a user-interface interference, and/or in response to an injected user-interface interference. The system may monitor one or more attributes of the input-user interactions, or of the user interactions, in order to extract or construct a user-specific pattern or model or profile; for example, reflecting or corresponding to: (a) whether the user rotates a cylinder clockwise or counter-clockwise; (b) whether the user utilizes one finger, or two fingers, or three fingers, in order to perform a rotation operation; (c) whether the user typically uses a top-area (or a bottom-area, or a right-area, or a left-area) of the cylinder in order to perform the rotation, or two particular (e.g., opposite) areas of the cylinder in order to perform the rotation; (d) the arrangement, distance and/or spacing between two or more fingers that the user utilizes for rotating the cylinder (e.g., measured via on-screen pixels distance between points of touching the touch-screen); (e) relative movement of each finger that is used for rotation, since not all fingers may move uniformly or at the same speed or to the same direction; (f) time-length or duration that it takes the user to perform a rotation; (g) whether the user typically performs one long rotation movement, or performs multiple shorter rotation movement, in order to achieve a rotation result of a particular type (e.g., a rotation result that requires rotation by at least 180 degrees); or the like. Optionally, one or more user-interface interferences or abnormalities may be injected or introduced; for example, causing an on-screen cylinder to become "stuck" or non-responsive for a pre-defined period of time (e.g., five seconds), causing an on-screen cylinder to rotate faster or slower relative to the rotation of the fingers of the user or to continue rotating after the user stopped his rotating gesture); and a user-specific profile or pattern may be extracted, based on the user's reactions to such interference. In a subsequent usage session or log-in session, an implicit TFA process may thus be able to verify that both: (a) the user knows and enters the correct credentials, and (b) the user enters the credentials in a manual manner that corresponds to (or matches) the user-specific profile that indicates how this user has previously reacted to such interference.

(3) Entering user credentials (e.g., username, password, PIN, or the like), optionally by utilizing the on-screen interface mentioned in (1) above, while de-activating the Enter (or Return) key on the keyboard, thereby requiring the user to click or tap on an on-screen "submit" button (since the Enter or Return key is non-responsive), and while introducing an interference or abnormality to the on-screen "submit" button (e.g., the on-screen "submit" button is non-responsive for a predefined time period, or the on-screen "submit" button is non-responsive for a pre-defined number of clicks, or the on-screen "submit" button is being moved sideways upon approach of the user's pointer; and while monitoring user-specific interaction patterns; thereby allowing the system to perform implicit TFA, by examining whether the user knows the corrected credentials (e.g., password or PIN), and also, whether the user's input-unit interactions (in response to the injected user-interface interference) match the previous user-specific pattern or profile or reaction to such interference.

(4) Presenting an on-screen collection of items (e.g., ten images of various objects or animals); and requesting the user to drag-and-drop, on the screen, one particular item from the collection, based on verbal or textual description that the user has to comprehend in order to match with the correct image; such as, "please drag the image of a Dog to the target zone", or "please drag the image that shows a Fruit to the target zone". While the user performs the drag-and-drop operation, the system may introduce a user-interface interference (e.g., the dragged item suddenly deviates sideways, or suddenly freezes or appears to be "stuck"), and the system may monitor the user's reaction or corrective-action to such interference. Subsequently, such login process may be utilized to verify that the person is human (since he needs to comprehend and process the textual request with the instruction in order to decide which on-screen item to drag from the collection) and that the human user is the genuine user (e.g., who previously logged-in to the service) based on matching of the user's reaction to the interference with a user-specific profile or pattern of reactions to such interference in previous usage sessions.

(5) Adding or introducing, intentionally, a delay or time-gap (which may be constant, or pseudo-random within a particular range of values), between: (a) the pressing or tapping or clicking of a character that the user clicks or taps or presses, as part of entering user credentials; and (b) the appearance of the character on the screen (or, the appearance of an additional "*" or "x" character which indicates that a password is being entered); while measuring the user-specific reaction or pattern-of-reactions to such injected delay or time-gap; and utilizing the user-specific pattern or profile of reactions as a means (or as additional means) in subsequent log-in sessions, or to detect fraudulent users, or to differentiate between users.

(6) Presenting an on-screen puzzle (e.g., a simple jigsaw puzzle) that the user has to solve or complete, by using drag-and-drop operations; monitoring and capturing user-specific cognitive choices (e.g., whether the user typically drags a right-side of the puzzle into the left-side, or whether the user typically drags the left-side of the puzzle into the right side; whether the user solves the puzzle in particular direction, or clockwise, or counter-clockwise, or in a sequence such that each selected piece is the closest to the previously-dragged piece); and optionally by introducing a user-interface interference to the process of solving the puzzle (e.g., a puzzle piece appears to be non-responsive or stuck for a pre-defined time period; a puzzle piece deviates or shifts away from the dragging-route that the user commanded with his gestures), and monitoring the user's reactions to such interference in order to extract a user-specific pattern or profile, which may then be used for user authentication or user differentiation purposes.

Optionally, system 200 may comprise a stochastic cryptography module 260, able to utilize stochastic cryptology and/or stochastic cryptography for various purposes such as remote access. For example, the stochastic cryptography module 260 may utilize cognitive aberrations or interruptions or interferences in order to monitor and utilize the response or reaction of the user for cryptographic tasks or cryptographic-related tasks (e.g., encryption, decryption, hashing, digital signing, authorizing, verification, or the like). The human user may be subjected to an aberration or interference (which may be selected by the system pseudo-randomly from a pool of pre-defined types of interferences), and thus may produce a reaction which may be user-specific and have some non-predictable properties (e.g., since each user reacts differently to each interference, and since the particular interference is selected pseudo-randomly from a pool of possible interference types)

In a demonstrative embodiment, system 200 may monitor the manner in which a user reacts to a user interface interference, that is selected by the system 200 from a pool of pre-defined types of interferences; for example, an interference in which the on-screen pointer appears to be "stuck" or non-responsive; an interference in which the on-screen pointer disappears for a pre-defined time period; an interference in which the on-screen pointer moves erratically, or moves in a manner that is not identical to the route of the movement of the input unit. The user reaction, or the corrective action by the user in response to such interference, may be monitored and analyzed by the system 200, and a user-specific reaction model may be extracted, on a per-user per-interference-type basis. This user-specific interference-specific reaction model may be used as a parameter known by the system in order to implement an algorithm (e.g., encryption, decryption) that utilizes stochastic cryptography or probabilistic cryptography.

For example, if a user requests to encrypt a document or file or digital asset or digital content item, then the encryption key (or the encryption algorithm) may utilize a user-specific parameter that has been previously extracted by the system by monitoring the user's reaction to a specific interference-type (e.g., as one of the multiplier numbers in establishing a unique product-of-multiplication number which may be used as encryption key). Similarly, in order to decrypt such an encrypted document or file or digital asset, then the system may introduce to the user an interference of the type of interferences that had been used to generate a key in the encryption process; may monitor the user's reaction to the interference; and may extract a user-specific parameter from the monitored user-specific reaction, which may then be used as part of the decryption process (and may be required for successful decryption). In some implementations, the encryption/decryption (or other cryptographic) algorithm may be stochastic or probabilistic, as it may sometimes fail to perform the cryptographic operation since the user's reaction to an interference in a particular instance may not be exactly identical to the user's previous reactions (which had been used in the encryption process); however, such errors may be estimated in advance and/or may be minimized, by taking into account probabilistic consideration.

For example, if it is estimated or observed that one-out-of-four times the user's reaction may not match a previously-calculated model of reaction to interference, then, in one-out-of-four attempts to access the encrypted data, the user may fail even though the user was the genuine user; however, the system may request the user to "try again", by introducing to the interface a same-type interference (e.g., the same interference-type, but the interference being of a different order-of-magnitude or scale), and upon such "further attempt" by the user, the system may extract a user-reaction which corresponds to the previously-calculated model, which had been used as a parameter in the encryption process.

In some embodiments, the stochastic encryption process may be implemented as follows. Initially, an enrollment phase or initiation stage may be performed, in order to monitor and measure the reaction(s) of a particular user to a variety of interferences that are presented to the user, one interference at a time, from a pre-defined pool of possible interferences (e.g., the pool having 5 or 15 or 60 or 100 or 250 or 500 or 800 such interferences, or interference-types, or approximately 200 to 900 interferences, or approximately 400 to 600 interferences). Then, the system may generate a user-specific model or profile, which indicates how the particular user reacts to interference(s) in general ("user-specific general reaction model"), and/or how the particular user reacts to a particular interference (to several particular interferences) in particular ("user-specific particular reaction model").

Subsequently, after the user-specific general reaction model is established, the system may utilize the user-specific general reaction model (or, one or more values of parameters of the user-specific general reaction model) as a parameter for encryption (e.g., for generating an encryption key, or for generating a private encryption key, or otherwise as part of an encryption algorithm. From that time-point and onward, the user-specific general reaction model (and/or any of its parameters) are not transferred, are not transmitted, and are not communicated among any two or more devices or units or entities. This may be in contrast with, for example, a process that utilizes a user's fingerprint as a parameter for encryption; which subsequently requires the user to provide his current fingerprint every time that the user desires to access or decrypt such encrypted content.

Subsequently, in order to decrypt the encrypted content, the system may present to the user an "invisible challenge", namely, an implicit challenge that the user may respond to without even knowing that a challenge-response process is taking place; and in each decryption request (or decryption attempt) that the use initiates, the system may present to the user a different type of invisible challenge from the pool of interferences that had been used by the system in order to build the user-specific general reaction model of that user; optionally by using or re-using a particular interference (or type of interference) while modifying or increasing or decreasing the scale or the order-of-magnitude of the interference or of one or more parameters of that interference or interference-type. Accordingly, the decryption process requires the user to react to a single particular interference out of the set of interferences that were used for generating the user-specific general reaction model; and the decryption process monitors and measures the user's reaction to the single, presented, interference.

Therefore, an attacker or a "listening hacker" that monitors the communication channel during an encryption request, or during multiple (series of) encryption requests, can see one single interference at a time, and one single user-specific reaction at a time to the presented single interference. Accordingly, such listening attacker may not be able to reverse-engineer or to estimate the user-specific general reaction model, which was computed based on numerous different interferences presented in series, and which was the basis for generating the encryption key or for generating encryption-related parameters. Optionally, in order to further burden a potential attacker, the original pool of possible interference may comprise hundreds or even thousands of various different interferences and/or interference-types, having various scales or orders-of-magnitude.

As a further clarification, the encryption process may be regarded as a process that generates and utilize a "generator function" able to generate random or pseudo-random numbers. The generator function exists on both sides; namely, e.g., on the system's stochastic encryption module which monitored and generated the user-specific general reaction model; and at the genuine user's side because the genuine user is able to react "correctly" to each particular interference, similarly to his previously-monitored reactions to such interference. The generator function is able to generate a similar (or identical) sequence or series of random (or pseudo-random) numbers, which are then used as a parameter for encryption; whereas, each decryption operation requires only one particular number from the series of random numbers that were used for the encryption. Accordingly, a listening attacker may be able to observe, at most, random values transmitted from the genuine user's side to the server, and may not be able to reverse-engineer or to estimate or to guess the "generator function" itself, and may not be able to predict or to guess or to estimate the next particular number that might be used in a subsequent decryption request. The generator function (which is used for encryption) may correspond to the user-specific general reaction model; whereas, the particular number for a particular decryption operation may correspond to the particular reaction of the specific user to a particular interference (out of a large set of interferences that had been used in order to generate the user-specific general reaction model for encryption purposes).

The present invention may thus provide various advantages and/or benefits, for cryptographic purposes. For example, a deterministic generator function might be subject to reverse-engineering or estimation, if an attacker listens to (or intercepts) a sufficiently-large number of random numbers generated by the deterministic generator function; whereas, the stochastic generator function of the present invention, which is based on the user-specific general reaction model, may not be reverse-engineered or estimated even if the attacker listens to a large number of values transmitted in a series of decryption requests; and the stochastic generator function may not be easily reverse-engineered or estimated since it is not based on a deterministic mathematical function.

Additionally or alternatively, each decryption attempt, in accordance with the present invention, requires an actual hands-on interaction of the user (or the attacker) with an input unit; thereby heavily burdening any attempt to implement a brute-force attack, or rendering such attack non-cost-effective, or requiring manual interaction for such brute-force attack, or requiring a significant amount of time for such brute-force attack; for example, since an attacker may not be able to merely automatically transmit a sequence of numbers (or values) without performing the hands-on manual human interaction that requires time for performance by the genuine user.

It is clarified that in some implementations, the stochastic encryption/decryption process may trigger "false positive" errors; such that, for example, a genuine user may not be able to decrypt his encrypted file (or content, or digital asset) even though the genuine user has reacted "correctly" to the specific invisible challenge (or interference) presented to him; and thus, two or more "correct" attempts (of reaction to interference) may sometimes be required, in order to allow a genuine user to decrypt his encrypted content. As described above, a deterministic or mathematic generator function always produces the same random numbers on both sides; whereas, the stochastic cryptography of the present invention may sometimes generate non-identical random numbers on both sides, since one side (the server's side) utilizes the previously-computed user-specific general reaction model, whereas the other side (the genuine user's side) utilizes the actual current reaction of the specific user, which may sometime deviate from the user's previous reactions that were used for generating the user-specific general reaction model.

It is clarified that terms such as, for example, "interference", "user interface interference", "input unit interference", "UI interference", "GUI interference", "UI element interference", "on-screen interference", "input process interference", "visual interference", "visible interference", "aberration", "perturbation", "abnormality", "anomaly", "irregularity", "perceived malfunction", "temporary malfunction", "invisible challenge", "hidden challenge", or other similar terms, may be used interchangeably; and may refer to one or more processes or operations in which an irregularity is introduced or generated or injected into a user-interface or is burdening or altering or modifying user interactions, or is generated in order to induce or elicit reaction or reactive action or corrective action in response to such interference(s); or a combination of two or more such interferences, introduced in series or in parallel or simultaneously, over one or more UI element(s) or GUI elements.

In some embodiments, a mood estimator 261 may continuously identify or estimate the mood or feelings of the user (e.g., a customer that utilizes an electronic device), when the user utilizes a website or an application. This may be used in order to adjust or modify or tailor messages (e.g., advertisements, proposals, promotions, business offerings) to the user. The system may inject cognitive aberrations or interferences to the interaction between the user and the application or website; and may monitor and measure the reaction of the user. The mood estimator 261 may compare between the current specific reaction of the user, and a historic profile of the user; and may identify parameters, for example, level of concentration or focusing, response speed, manner of reaction, or the like; thereby allowing a marketing/sales module or sub-system (which may be associated with the website or application) to further analyze the purchase-related and/or viewing-related (or browsing-related) behavior of the user by utilizing such parameters, in order to tailor or modify marketing proposals or other content displayed, to the particular cognitive state of the user as estimated at that time based on the user's reactions to injected interferences.

The terms "mobile device" or "mobile electronic device" as used herein may include, for example, a smartphone, a cellular phone, a mobile phone, a tablet, a handheld device, a portable electronic device, a portable gaming device, a portable audio/video player, or the like.

The term "pointing device" as used herein may include, for example, a mouse, a trackball, a pointing stick, a stylus, a joystick, a motion-sensing input device, a touch screen, a touch-pad, or the like.

The term "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from an authentication process. For example, after a login form was filled and submitted by the user, a demonstrative system may skip or not skip an additional authentication step (e.g., a security question) if the system recognizes the user as the genuine user.

Some embodiments may identify or detect a remote access attacker, or an attacker or a user that utilizes a remote access channel to access (or to attack, or to compromise) a computerized service.

In some embodiments, a method comprises: determining whether a user, who utilizes a computing device to interact with a computerized service, (i) is co-located physically near said computing device, or (ii) is located remotely from said computing device and controlling remotely said computer device via a remote access channel; wherein the determining comprises: (a) injecting, to a user interface of said computerized service, an interference which affects differently local users and remote users; (b) monitoring interactions of the user with an input unit, in response to said interference; (c) based on said monitoring, determining whether said user (i) is co-located physically at said computing device, or (ii) is located remotely from said computing device and controlling remotely said computing device via said remote access channel.

In some embodiments, the determining of step (c) is based on a latency between (A) the injecting of said interference, and (B) the input unit interactions of said user in response to said interference.

In some embodiments, the determining of step (c) is based on a type of reaction of said user to the injecting of said interference.

In some embodiments, the method comprises: hiding a mouse-pointer on a screen of said computerized service; monitoring input unit reactions of said user in response to the hiding of the mouse-pointer; based on the input unit reactions of said user in response to the hiding of the mouse-pointer, determining whether said user is (i) co-located physically at said computing device, or (ii) is located remotely from said computing device and controlling remotely said computing device via said remote access channel.

In some embodiments, the method comprises: replacing an original mouse-pointer on a screen of said computerized service, with a fake mouse-pointer deviated from a location of said original mouse-pointer; monitoring input unit interactions of said user when the fake mouse-pointer is displayed on said computing device that is accessing said computerized service; based on the input unit interactions with the fake mouse-pointer, determining whether said user is (i) co-located physically at said computing device, or (ii) is located remotely from said computing device and controlling remotely said computing device via said remote access channel.

In some embodiments, the method comprises: sampling multiple interactions of said user with said input unit; based on a frequency of said sampling, determining whether said user is (i) co-located physically at said computing device, or (ii) is located remotely from said computing device and controlling remotely said computing device via said remote access channel.

In some embodiments, the method comprises: sampling multiple interactions of said user with said input unit; based on a level of noise in said sampling, determining whether said user is (i) co-located physically at said computing device, or (ii) is located remotely from said computing device and controlling remotely said computing device via said remote access channel.

In some embodiments, the method comprises: sampling multiple interactions of said user with a computer mouse; if said sampling indicates generally-smooth movement of the computer mouse, then, determining that said user is co-located physically near said computing device.

In some embodiments, the method comprises: sampling multiple interactions of said user with a computer mouse; if said sampling indicates generally-rough movement of the computer mouse, then, determining that said user is located remotely from said computing device and controlling remotely said computing device via said remote access channel.

In some embodiments, the method comprises: sampling multiple interactions of said user with a computer mouse; if said sampling indicates generally-linear movement of the computer mouse, then, determining that said user is located remotely from said computing device and controlling remotely said computing device via said remote access channel.

In some embodiments, the method comprises: sampling multiple interactions of said user with a computer mouse; if said sampling indicates sharp-turn movements of the computer mouse, then, determining that said user is located remotely from said computing device and controlling remotely said computing device via said remote access channel.

In some embodiments, the method comprises: sampling multiple interactions of said user with said input unit; if a frequency of said multiple interactions is below a pre-defined threshold, then, determining that said user is located remotely from said computing device and controlling remotely said computing device via said remote access channel; if the frequency of said multiple interactions is above the pre-defined threshold, then, determining that said user is co-located physically near said computing device.

In some embodiments, the method comprises: overloading one or more resources of the computing device which is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: overloading a data transfer communication channel of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: overloading a screen display of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: displaying an instantaneous priming message on a screen of the computing device that is utilized for accessing said computerized service; measuring an effect of the instantaneous priming message on sampled user interactions via an input unit; based on the measured effect of said instantaneous priming message, determining whether said user is (i) co-located physically at said computing device, or (ii) is located remotely from said computing device and controlling remotely said computing device via said remote access channel.

In some embodiments, the method comprises: injecting, into a log-in screen of the computerized service, a user interface interference that causes non-remote users to perform corrective mouse gestures; immediately after a log-in into the computerized service, displaying a subsequent screen of the computerized service without said user interface interference; monitoring mouse gestures of the user in the subsequent screen; if the monitored mouse gestures in the subsequent screen comprise corrective mouse gestures, then, determining that a user of the subsequent screen is a local user located physically at the computing device; if the monitored mouse gestures in said subsequent screen lacks corrective mouse gestures, then, determining that a user of the subsequent screen is located remotely from said computing device and controlling remotely said computing device via said remote access channel.

In some embodiments, the method comprises: sampling user interactions with an input unit of said computing device; based on said sampling, determining that said user is utilizing a first set of hardware components which is capable of sampling the input unit at a first frequency; subsequently, (A) sampling additional, subsequent user interactions; (B) determining that a second, lower, frequency characterizes said subsequent sampling; (C) determining that a second, different, set of hardware components is being used; (D) determining that a non-authorized person is accessing said computerized service.

In some embodiments, the method comprises: sampling user interactions with an input unit of a mobile computing device; analyzing temporal relationship between touch and accelerometer events of sampled user interactions with said input unit of the mobile computing device; based on analysis of temporal relationship between touch and accelerometer events, of sampled user interactions with said input unit of the mobile computing device, determining whether the said mobile computing device is controlled remotely via said remote access channel.

In some embodiments, the method comprises: sampling user interactions with an input unit of a mobile computing device; analyzing temporal relationship between touch movement events and accelerometer events, of sampled user interactions with said input unit of the mobile computing device; based on analysis of temporal relationship between touch movement event and accelerometer events, of sampled user interactions with said input unit of the mobile computing device, determining whether the said mobile computing device is controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) based on a mismatch between (i) sampled touch-based gestures, and (ii) sampled accelerometer data, determining that the mobile computing device was controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) determining that sampled touch-based gestures indicate that a user operated the mobile computing device at a particular time-slot; (D) determining that the sampled accelerometer data indicate that the mobile computing device was not moved during said particular time-slot; (E) based on the determining of step (C) and the determining of step (D), determining that the mobile computing device was controlled remotely via said remote access channel during said particular time-slot.

In some embodiments, a comprises: a user identity determination module to determine whether a user, who utilizes a computing device to interact with a computerized service, is either (i) co-located physically near said computing device, or (ii) located remotely from said computing device and is controlling remotely said computer device via a remote access channel; wherein the user identity determination module is: (a) to inject, to a user interface of said computerized service, an interference which affects differently local users and remote users; (b) to monitor interactions of the user with an input unit, in response to said interference; (c) based on the monitored interactions, to determine whether said user (i) is co-located physically at said computing device, or (ii) is located remotely from said computing device and controlling remotely said computing device via said remote access channel.

In some embodiments, the user identity determination module is to determine in step (c), based on a latency between (A) injection of said interference, and (B) the input unit interactions of said user in response to said interference.

In some embodiments, the user identity determination module is to determine in step (c), based on a type of reaction of said user to the injecting of said interference.

Some embodiments may detect a malicious automatic script, and/or may detect malicious code injection (e.g., malicious HTML code injection).

In some embodiments, a method comprises: determining whether a user, who utilizes a computing device to interact with a computerized service, (i) is a human user, or (ii) is an automatic script executed by a processor; wherein the determining comprises: (a) monitoring user-side input-unit interactions performed through one or more input units; (b) matching between (A) the user-side input-unit interactions and (B) data sent electronically from said computerized service; (c) if the comparing result is that (A) the user-side input-unit interactions do not exactly match (B) the data sent electronically from said computerized service, then determining that the computing device is operated by automatic script executed by said processor.

In some embodiments, the method comprises: based on the monitoring of the user-side input-unit interactions, detecting absence of any user-side input-unit interactions within a pre-defined time period during which the computing device transmitted data to the computerized service; based on detecting absence of any user-side input-unit interactions within said pre-defined time period, determining whether the computing device is operated by automatic script executed by said processor.

In some embodiments, the method comprises: based on the monitoring of the user-side input-unit interactions, detecting a number of keystrokes entered via a keyboard within a pre-defined time period during which the computing device transmitted data to the computerized service; determining a total number of keystrokes that a human is expected to manually enter in order to cause the computing device to transmit said data to the computerized service; based on matching between (A) the number of keystrokes entered via the keyboard, and (B) the total number of keystrokes that the human is expected to manually enter, determining whether the computing device is operated by automatic script executed by said processor.

In some embodiments, the method comprises: based on the monitoring of the user-side input-unit interactions, determining that keystrokes entered via a keyboard, within a pre-defined time period during which the computing device transmitted data to the computerized service, correspond to: (a) a first batch of keystrokes having a first keystrokes-length; and (b) a second batch of keystrokes having a second keystrokes-length; determining that the data transmitted from the computing device to the computerized service corresponds to: (A) a first string having a first string-length; and (B) a second string having a second string-length; based on matching between the first keystrokes-length and the first string-length, determining whether the computing device is operated by automatic script executed by said processor.

In some embodiments, the method comprises: based on the monitoring of the user-side input-unit interactions, determining that keystrokes entered via a keyboard, within a pre-defined time period during which the computing device transmitted data to the computerized service, correspond to: (a) a first batch of keystrokes having a first keystrokes-length; and (b) a second batch of keystrokes having a second keystrokes-length; determining that the data transmitted from the computing device to the computerized service corresponds to: (A) a first string having a first string-length; and (B) a second string having a second string-length; wherein a total of the first and second keystrokes-length, is equal to a total of the first and second string lengths; based on matching between the first keystrokes-length and the first string-length, determining whether the computing device is operated by automatic script executed by said processor.

In some embodiments, the method comprises: monitoring time-intervals among the user-side input-unit interactions; based on said time-intervals among the user-side input-unit interactions being constant, determining that the computing device is operated by an automatic script executed by said processor.

In some embodiments, the method comprises: monitoring time-intervals among the user-side input-unit interactions; modeling human user's time-intervals among the user-side input-unit interactions; based on comparing between (A) said monitored time-intervals among the user-side input-unit interactions and (B) said modeled human user's time-intervals among the user-side input-unit interactions, determining whether the computing device is operated by an automatic script executed by said processor.

In some embodiments, the method comprises: monitoring time-gaps among the user-side input-unit interactions; determining distribution of said time-gaps among the user-side input-unit interactions; if said distribution corresponds to a pseudo-random distribution, then determining that the computing device is operated by automatic script executed by said processor.

In some embodiments, the method comprises: monitoring time-gaps among the user-side input-unit interactions; storing in a database a user profile indicating that a particular human user typically types at a particular temporal pattern of typing when interacting with said computerizes service; subsequently, determining whether a current temporal pattern of typing, reflected in a current usage session of said computing device for interacting with said computerized service, is different by at least a threshold percentage from said particular temporal pattern of typing stored in said user profile; based on said determining, further determining whether the computing device is operated by automatic script executed by said processor.

In some embodiments, the method comprises: monitoring time-gaps among the user-side input-unit interactions; storing in a database a user profile indicating that a particular human user typically types a particular sequence of multiple characters in a specific temporal pattern; subsequently, monitoring keystrokes of current user-side input-unit interactions; determining whether the current user-side input-unit interactions, comprise typing of said particular sequence of multiple characters, but do not comprise rapid typing of said particular sequence of multiple characters; based on said determining, further determining whether the computing device is operated by automatic script executed by said processor.

In some embodiments, the method comprises: computing a first checksum of data entered manually via a keyboard of said computing device; receiving from said computerized service a second checksum of user-provided data which was transmitted from the computing device to the computerized service; matching between (A) the first checksum of data entered manually via the keyboard of said computing device, and (B) the second checksum of user-provided data which was transmitted from the computing device to the computerized service; based on said matching of said first and second checksums, determining whether the computing device is operated by automatic script executed by said processor.

In some embodiments, the method comprises: computing a first checksum of data entered manually via a keyboard of said computing device; receiving from said computerized service a second checksum of user-provided data which was transmitted from the computing device to the computerized service; matching between (A) the first checksum of data entered manually via the keyboard of said computing device, and (B) the second checksum of user-provided data which was transmitted from the computing device to the computerized service; based on said matching of said first and second checksums, determining whether the computing device is operated by automatic script executed by said processor; wherein said determining is performed without receiving from said computerized service of a copy of said user-provided data which was transmitted from the computing device to the computerized service.

In some embodiments, the method comprises: computing a first hashing result of data entered manually via a keyboard of said computing device; receiving from said computerized service a second hashing result of user-provided data which was transmitted from the computing device to the computerized service; matching between (A) the first hashing result of data entered manually via the keyboard of said computing device, and (B) the second hashing result of user-provided data which was transmitted from the computing device to the computerized service; based on said matching of said first and second hashing results, determining whether the computing device is operated by automatic script executed by said processor.

In some embodiments, the method comprises: computing a first hashing result of data entered manually via a keyboard of said computing device; receiving from said computerized service a second hashing result of user-provided data which was transmitted from the computing device to the computerized service; matching between (A) the first hashing result of data entered manually via the keyboard of said computing device, and (B) the second hashing result of user-provided data which was transmitted from the computing device to the computerized service; based on said matching of said first and second hashing results, determining whether the computing device is operated by automatic script executed by said processor; wherein said determining is performed without receiving from said computerized service of a copy of said user-provided data which was transmitted from the computing device to the computerized service.

In some embodiments, the method comprises: comparing (A) meta-data about the user-side input-unit interactions, with (B) meta-data about the data sent electronically from said computing device to said computerized service; wherein the method is performed without receiving from said computerized service a copy of the data sent electronically from said computing device to said computerized service; matching (A) the meta-data about the user-side input-unit interactions, with (B) the meta-data about the data sent electronically from said computing device to said computerized service; based on said matching, determining whether the computing device is operated by automatic script executed by said processor.

In some embodiments, the method comprises: determining that the computing device is infected by a code injector malware, by performing: detecting a mismatch between (A) a total number of data fields that the computing device transmitted to said computerized service, and (B) a total number of data fields that the user of the computing device filled-out manually via a keyboard of said computing device.

In some embodiments, the method comprises: determining that the computing device is infected by a code injector malware, by performing: detecting a mismatch between (A) a total number of data fields that the computing device transmitted to said computerized service, and (B) a total number of strings that the user of the computing device typed manually via a keyboard of said computing device.

In some embodiments, the method comprises: determining that the computing device is infected by a code injector malware, by performing: (a) receiving from said computerized service, meta-data about a number of filled-out fields that the computerized service received electronically from said computing device; (b) based on monitored user-side input-unit interactions, that were manually performed via a keyboard of said computing device, calculating meta-data about a number of filled-out fields that were manually filled-out via said keyboard; (c) detecting a mismatch between (A) the meta-data about the number of filled-out fields that the computerized service received electronically from said computing device, and (B) the calculated meta-data about the number of filled-out fields that were manually filled-out via said keyboard.

In some embodiments, the method comprises: determining that the computing device is infected by a code injector malware, by performing: (a) receiving from said computerized service, meta-data about a number of filled-out fields that the computerized service received electronically from said computing device; (b) based on monitored user-side input-unit interactions, that were manually performed via a keyboard of said computing device, calculating meta-data about a number of filled-out fields that were manually filled-out via said keyboard; (c) detecting a mismatch between (A) the meta-data about the number of filled-out fields that the computerized service received electronically from said computing device, and (B) the calculated meta-data about the number of filled-out fields that were manually filled-out via said keyboard; wherein detecting said mismatch is performed without receiving, and without taking into consideration, a copy of the data that the computerized service received electronically from said computing device.

In some embodiments, the method comprises: based on monitored user-side input-unit interactions, computing a particular velocity profile of pointer strokes; generating a model corresponding to velocity profile of pointer strokes performed by human users; based on comparison between (A) said particular velocity profile, and (B) said model corresponding to velocity profile of pointer strokes performed by human users, determining whether the computing device is operated by automatic script executed by said processor.

In some embodiments, the method comprises: based on monitored user-side input-unit interactions, extracting a particular time interval profile reflecting time intervals between down click events and up click events of a pointing device; generating a model of time intervals between down click events and up click events of pointing devices performed by human users; based on a comparison between (A) said particular time interval profile, and (B) said model of time intervals between down-click events and up click events of pointing devices performed by human users, determining whether the computing device is operated by automatic script executed by said processor.

In some embodiments, the method comprises: based on monitored user-side input-unit interactions, extracting a profile of time intervals between pointer strokes and down click events of a pointing device; generating a model of time intervals between pointer strokes and down click events of pointing devices performed by human users; based on comparing between (A) said profile of time intervals, and (B) said model of time intervals, determining whether the computing device is operated by automatic script executed by said processor.

In some embodiments, a system comprises: an automatic script detector module to determine whether a user, who utilizes a computing device to interact with a computerized service, is either (i) a human user, or (ii) an automatic script executed by a processor; wherein the automatic script detector module is: (a) to monitor user-side input-unit interactions performed through one or more input units; (b) to match between (A) the user-side input-unit interactions and (B) data sent electronically from said computerized service; (c) if the comparing result is that (A) the user-side input-unit interactions do not exactly match (B) the data sent electronically from said computerized service, then to determine that the computing device is operated by automatic script executed by said processor.

Some embodiments may detect hardware components and/or hardware assembly.

In some embodiments, a method comprises: differentiating between (a) a first hardware assembly utilized for interacting with a computerized service, and (b) a second hardware assembly utilized for interacting with said computerized service, by performing: monitoring user-side input-unit interactions of one or more input units which are being used for interacting with said computerized service; extracting from said user-side input-unit interactions a hardware-assembly-specific usage characteristic; performing said differentiating based on said hardware-assembly-specific usage characteristic.

In some embodiments, the differentiating is independent of, and does not take into account, data stored in any cookie file on any one of the first and second hardware assemblies.

In some embodiments, the differentiating is independent of, and does not take into account, Internet Protocol (IP) addresses associated with any one of the first and second hardware assemblies.

In some embodiments, the method comprises: sampling pointing-device-events of said user-side input-unit interactions; determining a device-specific signature reflecting said pointing-device-events sampling; performing said differentiating based on said device-specific signature reflecting said pointing-device-events sampling.

In some embodiments, the method comprises: sampling keyboard-events of said user-side input-unit interactions; determining a device-specific signature reflecting said keyboard-events sampling; performing said differentiating based on said device-specific signature reflecting said keyboard-events sampling.

In some embodiments, the method comprises: sampling touchpad-events of said user-side input-unit interactions; determining a device-specific signature reflecting said touchpad-events sampling; performing said differentiating based on said device-specific signature reflecting said touchpad-events sampling.

In some embodiments, the method comprises: sampling pointing-stick events of said user-side input-unit interactions; determining a device-specific signature reflecting said pointing-stick events sampling; performing said differentiating based on said device-specific signature reflecting said pointing-stick events sampling.

In some embodiments, the method comprises: measuring a first length of a longest-stroke of on-screen pointer movement, in a first usage session of the computerized service; measuring a first length of a longest-stroke of on-screen pointer movement, in a second usage session of the computerized service; if the first length of the longest-stroke in the first usage session, is different from the second length of the longest-stroke in the second usage session, by at least a pre-defined percentage value, then determining that (A) the first usage session of the computerized service was accessed via the first hardware assembly, and that (B) the second usage session of the computerized service was accessed via the second hardware assembly.

In some embodiments, the method comprises: measuring a first length of a longest-stroke of on-screen pointer movement, in a first usage session of the computerized service; measuring a first length of a longest-stroke of on-screen pointer movement, in a second usage session of the computerized service; if the first length of the longest-stroke in the first usage session, is different from the second length of the longest-stroke in the second usage session, by at least a pre-defined percentage value, then determining that (A) the first usage session of the computerized service was accessed via a computer mouse, and that (B) the second usage session of the computerized service was accessed via a touchpad.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a computer mouse, and that (B) the second usage session of the computerized service was accessed via a touchpad.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a computer mouse, and that (B) the second usage session of the computerized service was accessed via a pointing-stick.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a touchpad, and that (B) the second usage session of the computerized service was accessed via a pointing-stick.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a computer mouse, and that (B) the second usage session of the computerized service was accessed via a touchpad.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a computer mouse, and that (B) the second usage session of the computerized service was accessed via a pointing-stick.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a touchpad, and that (B) the second usage session of the computerized service was accessed via a pointing-stick.

In some embodiments, the method comprises: sampling and analyzing mouse-events in a first usage session of the computerized service; sampling and analyzing mouse-events in a second usage session of the computerized service; based on differences between (a) the sampled and analyzed mouse events in the first usage session, and (b) the sampled and analyzed mouse events in the second usage session, determining that (A) the first usage session was accessed via a first mouse-device made by a first manufacturer, and that (B) the second usage session was accessed via a second mouse-device made by a second manufacturer.

In some embodiments, the method comprises: sampling and analyzing mouse-events in a first usage session of the computerized service; sampling and analyzing mouse-events in a second usage session of the computerized service; based on differences between (a) the sampled and analyzed mouse events in the first usage session, and (b) the sampled and analyzed mouse events in the second usage session, determining that (A) the first usage session was accessed via a first mouse-device made by a particular manufacturer and having a particular model number, and that (B) the second usage session was accessed via a second mouse-device made by the same particular manufacturer and having the same particular model number.

In some embodiments, the method comprises: temporarily generating a resource-consuming burden on client-side hardware assemblies that are used for accessing said computerized service; measuring performance of multiple client-side hardware assemblies in response to the generated resource-consuming burden; based on the measured performance of multiple client-side hardware assemblies in response to the generated resource-consuming burden, differentiating between said first hardware assembly and said second hardware assembly.

In some embodiments, the method comprises: temporarily generating a computation-intensive burden on client-side hardware assemblies that are used for accessing said computerized service; measuring performance of multiple client-side hardware assemblies in response to the generated computation-intensive burden; based on the measured performance of multiple client-side hardware assemblies in response to the generated computation-intensive burden, differentiating between said first hardware assembly and said second hardware assembly.

In some embodiments, the method comprises: monitoring keyboard interactions with said computerized service; identifying a sequence of multiple particular characters, that are entered consecutively via keyboard more rapidly than other character sequences; determining that said sequence of multiple characters, is more common in a particular natural language; determining that said computerized service is accessed via a hardware assembly utilizing a keyboard having a keyboard-layout of said particular natural language.

In some embodiments, the method comprises: monitoring keyboard interactions with said computerized service; identifying a sequence of multiple particular characters, that are entered consecutively via keyboard more rapidly than other character sequences; determining that said sequence of multiple characters, is more common in a particular natural language; determining that said computerized service is accessed via a hardware assembly utilizing a keyboard having a keyboard-layout of said particular natural language; wherein both of said determining operations are performed without taking into consideration an Internet Protocol (IP) address associated with said hardware assembly being used for accessing said computerized service.

In some embodiments, the method comprises: displaying through said computerized service a challenge requesting a user to correctly enter a particular word in a particular non-English natural language, wherein typing of the particular word requires typing an accented character; receiving user-entered keystrokes which indicate typing of said particular word while typing said accented character; based on said user-entered keystrokes which indicate typing of said particular word while typing said accented character, determining that the computerized service is accessed by a user that utilizes a keyboard having a non-English keyboard layout which corresponds to said particular non-English natural language.

In some embodiments, the method comprises: displaying through said computerized service a challenge requesting a user to correctly enter a particular word in a particular non-English natural language, wherein typing of the particular word requires typing a character having a diacritical mark; receiving user-entered keystrokes which indicate typing of said particular word while typing said character having said diacritical mark; based on said user-entered keystrokes which indicate typing of said particular word while typing said character having said diacritical mark, determining that the computerized service is accessed by a user that utilizes a keyboard having a non-English keyboard layout which corresponds to said particular non-English natural language.

In some embodiments, a system comprises a hardware assembly detector module to differentiate between (a) a first hardware assembly utilized for interacting with a computerized service, and (b) a second hardware assembly utilized for interacting with said computerized service; wherein the hardware assembly detector module is: to monitor user-side input-unit interactions of one or more input units which are being used for interacting with said computerized service; to extract from said user-side input-unit interactions a hardware-assembly-specific usage characteristic; to perform differentiation based on said hardware-assembly-specific usage characteristic.

Some embodiments may enable user segmentation based on monitoring of input-unit interactions.

In some embodiments, a method comprises: differentiating between (a) a first user interacting with a computerized service, and (b) a second user interacting with said computerized service; wherein the differentiating does not rely on Internet Protocol (IP) address analysis; wherein the differentiating does not rely on cookie files analysis; wherein the differentiating comprises: monitoring user-side input-unit interactions with said computerized service; extracting from said user-side input-unit interactions a user-specific characteristic; based on the user-specific characteristic extracted from said user-side input-unit interactions, differentiating between said first user and said second user.

In some embodiments, the differentiating (A) does not rely on injection of a user-interface interference to said computerized service, and (B) does not rely on user reaction to any user-interface interference.

In some embodiments, the extracting comprises: extracting from said user-side input-unit interactions a user-specific characteristic which indicates at least one of: (a) user gender; (b) user age-range; (c) user geographic location; (d) user level of expertise in computer-related tasks; (e) user anatomical characteristics.

In some embodiments, the method comprises: monitoring utilization of keyboard shortcuts during interactions with said computerized service; based on the monitored utilization of keyboard shortcuts during interactions with said computerized service, determining the level of expertise of a particular user in operating computerized platforms.

In some embodiments, the method comprises: monitoring utilization of keyboard shortcuts during interactions with said computerized service; based on the monitored utilization of keyboard shortcuts during interactions with said computerized service, determining whether a particular user is (a) within an age-range of 15 to 30 years old, or (b) within an age-range of 65 and greater years old.

In some embodiments, the method comprises: monitoring utilization of copy-and-paste operations during interactions with said computerized service; based on the monitored utilization of copy-and-paste operations during interactions with said computerized service, determining the level of expertise of a particular user in operating computerized platforms In some embodiments, the method comprises: monitoring average typing speed during interactions with said computerized service; based on the monitored average typing speed during interactions with said computerized service, determining the level of expertise of a particular user in operating computerized platforms.

In some embodiments, the method comprises: monitoring average typing speed during interactions with said computerized service; based on the monitored average typing speed during interactions with said computerized service, determining whether a particular user is an old user or a young user.

In some embodiments, the method comprises: monitoring user keystrokes during interactions with said computerized service; extracting statistics of time-gaps between pairs of key-down and key-up events; based on the extracted statistics of said time-gaps between pairs of key-down and key-up events, determining whether a particular user is a male user or a female user.

In some embodiments, the method comprises: monitoring keyboard interactions of a user with said computerized service; extracting statistics of time-gaps between pairs of key-down and key-up events, for keys in different locations along the keyboard; based on the extracted statistics of time-gaps, determining whether the fingers of a particular user are short or long.

In some embodiments, the method comprises: monitoring keystrokes of a first user during interactions with said computerized service; extracting first statistics of the time-gaps between pairs of key-down and key-up events during the first user interactions with the computerized service; monitoring keystrokes of a second user during interactions with said computerized service; extracting second statistics of the time-gaps between pairs of key-down and key-up events during the second user interactions with the computerized service; based on said extracted first statistics of first user and said extracted second statistics of second user, differentiating that the first user is male and that the second user is female.

In some embodiments, the method comprises: monitoring keyboard interactions of a first user with said computerized service; identifying a sequence of multiple particular characters, that are entered by the first user consecutively via keyboard more rapidly than other character sequences that the first user types; determining that said sequence of multiple characters, is more common in a particular natural language; determining that keyboard interactions of a second user, with said computerized service, lack rapid typing of said sequence of particular characters; based on both of said determining, differentiating between the first user and the second user.

In some embodiments, the method comprises: monitoring keyboard interactions of a first user with said computerized service; identifying a sequence of multiple particular characters, that are entered by the first user consecutively via keyboard more rapidly than other character sequences that the first user types; determining that said sequence of multiple characters, is more common for users of a particular keyboard layout that is more common at a particular geographic region; determining that keyboard interactions of a second user, with said computerized service, lack rapid typing of said sequence of particular characters; based on both of said determining, differentiating between the first user and the second user.

In some embodiments, the method comprises: sampling user-side input-unit interactions of a user with said computerized service; performing frequency analysis of said sampled user-side input-unit interactions of a first user with said computerized service; based on said frequency analysis, determining characteristics of a power supply of the computing device of said user; based on determinations of characteristics of the power supply of the computing device of said user, determining that the computing device of said user is located in a particular geographic region.

In some embodiments, the method comprises: monitoring keyboard interactions of a first user with said computerized service; based on characteristics of the monitored keyboard interactions, determining both (A) gender of the first user, and (B) age-range of said user; based on the determined gender and age-range of said first user, displaying to said first user tailored advertisement content.

In some embodiments, the method comprises: monitoring keyboard interactions of a first user with said computerized service; based on characteristics of the monitored keyboard interactions, determining both (A) a natural language spoken by the first user, and (B) age-range of said user; based on the determined natural language and age-range of said first user, displaying to said first user tailored advertisement content.

In some embodiments, the method comprises: monitoring user-side input-unit interactions of the first user with said computerized service; based on characteristics of the monitored keyboard interactions and pointing device events, determining a current mood of said user; based on the determined mood of said first user, displaying to said first user tailored content suitable for said current mood of said first user.

In some embodiments, a system comprises: a user identity determination module to differentiate between (a) a first user interacting with a computerized service, and (b) a second user interacting with said computerized service; wherein the differentiating by the user identity determination module does not rely on Internet Protocol (IP) address analysis; wherein the differentiating by the user identity determination module does not rely on cookie files analysis; wherein the user identity determination module is: to monitor user-side input-unit interactions with said computerized service; to extract from said user-side input-unit interactions a user-specific characteristic; based on the user-specific characteristic extracted from said user-side input-unit interactions, to differentiate between said first user and said second user.

In some embodiments, the system comprises: a user expertise estimator module (A) to monitor utilization of keyboard shortcuts during interactions with said computerized service, and (B) based on the monitored utilization of keyboard shortcuts during interactions with said computerized service, determining the level of expertise of a particular user in operating computerized platforms.

In some embodiments, the system comprises: a user gender estimator module (a) to monitor user keystrokes during interactions with said computerized service, (b) to extract statistics of time-gaps between pairs of key-down and key-up events, and (c) based on the extracted statistics of said time-gaps between pairs of key-down and key-up events, to determine whether a particular user is a male user or a female user.

Some embodiments may identify multiple-users accessing the same account (e.g., subscription account, personal account).

In some embodiments, a method comprises: determining that a particular subscription account of a computerized service, is accessed by two different human users who utilize a same set of login credentials, by performing: (a) monitoring input-unit interactions of pairs of usage sessions that originated from pairs of two different subscriptions accounts; (b) extracting from the input-unit interactions that were monitored in step (a), a cross-account usage-session pairing pattern; (c) monitoring input-unit interactions of pairs of usage sessions that originated from a same subscription account; (d) extracting from the input-unit interactions that were monitored in step (c), an intra-account usage-session pairing pattern; (e) determining whether a pair of usage sessions, that originated from said particular subscription account, is: (i) relatively more similar to the cross-account usage-session pairing pattern, or (ii) relatively more similar to the intra-account usage-session pairing pattern.

In some embodiments, the method comprises: if it is determined in step (e) that the pair of usage session, that originated from said particular subscription account, is relatively more similar to the cross-account usage-session pairing pattern, then generating a notification that said particular subscription account is accessed by two different human users who utilize the same set of login credentials.

In some embodiments, the monitoring of step (a) comprises: monitoring input-unit interactions of pairs of usage sessions that originated from pairs of two different subscriptions accounts and which comprise user reactions to an injected user-interface interference; wherein the monitoring of step (c) comprises: monitoring input-unit interactions of pairs of usage sessions that originated from a same subscription account and which comprise user reactions to said injected user-interface interference.

In some embodiments, the monitoring of step (a) comprises: monitoring input-unit interactions of pairs of usage sessions that originated from pairs of two different subscriptions accounts and which comprise natural interactions that are not induced by any user-interface interference; wherein the monitoring of step (c) comprises: monitoring input-unit interactions of pairs of usage sessions that originated from a same subscription account and which comprise natural interactions that are not induced by any user-interface interference.

In some embodiments, the method comprises: checking whether a characteristic of monitored user-interface interactions over a pair of usage-sessions of a same subscription account, is more similar to either: (i) a first pattern of user-interface interactions that characterize multiple pairs of usage sessions of different human users, or (ii) a second pattern of user-interface interactions that characterizes multiple pairs of usage sessions wherein each pair of usage session belong to the same subscription account.

In some embodiments, the method comprises: if it is determined that said characteristic of monitored user-interface interactions, over said pair of usage-sessions of the same subscription account, is more similar to said first pattern of user-interface interactions that characterize multiple pairs of usage sessions of different human users, then generating a notification that said particular subscription account is accessed by two different human users who utilize the same set of login credentials.

In some embodiments, the method comprises: checking whether a characteristic of monitored user-interface interactions over a pair of usage-sessions of a same subscription account, that comprise user reactions to an injected user-interface interference, is more similar to either: (i) a first pattern of user-interface interactions that characterize multiple pairs of usage sessions of different human users, or (ii) a second pattern of user-interface interactions that characterizes multiple pairs of usage sessions wherein each pair of usage session belong to the same subscription account.

In some embodiments, the method comprises: if it is determined that said characteristic of monitored user-interface interactions, over said pair of usage-sessions of the same subscription account, that comprise user reactions to said injected user-interface interference, is more similar to said first pattern of user-interface interactions that characterize multiple pairs of usage sessions of different human users, then generating a notification that said particular subscription account is accessed by two different human users who utilize the same set of login credentials.

In some embodiments, the computerized service comprises a service selected from the group consisting of: a digital streaming video service; a digital streaming audio service; an online gaming service.

In some embodiments, the computerized service comprises a service selected from the group consisting of: an online premium-content service available only to paying subscribers; an online legal information service available only to paying subscribers; an online financial information service available only to paying subscribers; an online business information service available only to paying subscribers; an online news information service available only to paying subscribers.

In some embodiments, the method comprises: generating an attributes vector for each usage session; utilizing a clustering algorithm to determine the number of most-probable sources for the usage sessions; based on the clustering result, determining whether the usage sessions correspond to one use or to multiple users.

In some embodiments, the method comprises: generating an ad-hoc model reflecting user-side interactions that were performed in all usage sessions that originated from a particular computing device; based on said ad-hoc model, for all other usage sessions accesses using a different device, comparing said usage sessions to said model; if a particular usage session is determined to be significantly different than said ad-hoc model, then determining the said particular usage session originated from a different user.

In some embodiments, a method comprises: determining that a particular subscription account of a computerized service, is accessed by two or more different human users who utilize a same set of login credentials, by performing: (a) monitoring input-unit interactions of sets of multiple usage sessions that originated from sets of multiple different subscriptions accounts; (b) extracting from the input-unit interactions that were monitored in step (a), a cross-account usage-session grouping pattern; (c) monitoring input-unit interactions of sets of usage sessions that originated from a same subscription account; (d) extracting from the input-unit interactions that were monitored in step (c), an intra-account usage-session grouping pattern; (e) determining whether a set of multiple usage sessions, that originated from said particular subscription account, is: (i) relatively more similar to the cross-account usage-session grouping pattern, or (ii) relatively more similar to the intra-account usage-session grouping pattern.

In some embodiments, each one of the sets of multiple usage sessions comprise a pair of usage sessions.

In some embodiments, each one of the sets of multiple usage sessions comprise a set of three usage sessions.

In some embodiments, each one of the sets of multiple usage sessions comprise a group of four usage sessions.

In some embodiments, a system comprises: a multiple-users for same account detector, to determine that a particular subscription account of a computerized service, is accessed by two different human users who utilize a same set of login credentials; wherein the multiple-users for same account detector is: (a) to monitor input-unit interactions of pairs of usage sessions that originated from pairs of two different subscriptions accounts; (b) to extract from the input-unit interactions that were monitored in step (a), a cross-account usage-session pairing pattern; (c) to monitor input-unit interactions of pairs of usage sessions that originated from a same subscription account; (d) to extract from the input-unit interactions that were monitored in step (c), an intra-account usage-session pairing pattern; (e) to determine whether a pair of usage sessions, that originated from said particular subscription account, is: (i) relatively more similar to the cross-account usage-session pairing pattern, or (ii) relatively more similar to the intra-account usage-session pairing pattern.

In some embodiments, if it is determined in step (e) that the pair of usage session, that originated from said particular subscription account, is relatively more similar to the cross-account usage-session pairing pattern, then the multiple-users for same account detector is to generate a notification that said particular subscription account is accessed by two different human users who utilize the same set of login credentials.

In some embodiments, in step (a), the multiple-users for same account detector is to monitor input-unit interactions of pairs of usage sessions that originated from pairs of two different subscriptions accounts and which comprise user reactions to an injected user-interface interference; wherein in step (c), the multiple-users for same account detector is to monitor input-unit interactions of pairs of usage sessions that originated from a same subscription account and which comprise user reactions to said injected user-interface interference.

In some embodiments, the multiple-users for same account detector is to determine that a particular subscription account of a computerized service, is accessed by two or more different human users who utilize a same set of login credentials, by performing: (a) monitoring input-unit interactions of sets of multiple usage sessions that originated from sets of multiple different subscriptions accounts; (b) extracting from the input-unit interactions that were monitored in step (a), a cross-account usage-session grouping pattern; (c) monitoring input-unit interactions of sets of usage sessions that originated from a same subscription account; (d) extracting from the input-unit interactions that were monitored in step (c), an intra-account usage-session grouping pattern; (e) determining whether a set of multiple usage sessions, that originated from said particular subscription account, is: (i) relatively more similar to the cross-account usage-session grouping pattern, or (ii) relatively more similar to the intra-account usage-session grouping pattern.

Some embodiments may enable a visual login process, as well as an implicit two-factor authentication (TFA) process, and stochastic cryptography based on monitored user-side input-unit interactions.

In some embodiments, a method comprises: differentiating between a first user and a second user of a computerized service, by performing: presenting an on-screen visual login interface which requires a user of the computerized service to interact with user interface elements in order to enter user login credentials for said computerized service; monitoring interactions of said used via an input unit with said user interface elements of said on-screen visual login interface; extracting from said interaction of the user via the input unit, a user-specific trait indicating a user-specific manner of interaction with said on-screen visual login interface; based on the extracted user-specific manner of interaction, differentiating between a first user and a second user of said computerized service.

In some embodiments, the presenting comprises: presenting an on-screen keypad of digits, and an on-screen target zone; generating a drag-and-drop interface that allows the user to selectively drag individual digits, which correspond to a Personal Identification Number (PIN) that the user desires to enter, from said on-screen keypad to said on-screen target zone; wherein the monitoring of interactions comprises: monitoring a manner in which the user performs drag-and-drop operations of said individual digits, and extracting a user-specific trait from said drag-and-drop operations of individual digits.

In some embodiments, the presenting comprises: presenting an on-screen vault interface having one or more on-screen cylinders; generating an on-screen interface that allows the user to selectively rotate the one or more on-screen rotatable cylinders in order to input a Personal Identification Number (PIN) that the user desires to enter; wherein the monitoring of interactions comprises: monitoring a manner in which the user performs rotations of the one or more on-screen rotatable cylinders, and extracting a user-specific trait from said rotations.

In some embodiments, the method comprises: injecting a user interface interference to an operation of said user interface elements; monitoring a corrective reaction of the user to the injected user interface interference; extracting a user-specific trait corresponding to said corrective reaction; based on the user-specific trait corresponding to said corrective reaction, differentiating between the first user and the second user of said computerized service.

In some embodiments, the presenting comprises: presenting an on-screen keypad of digits, and an on-screen target zone; generating a drag-and-drop interface that allows the user to selectively drag individual digits, which correspond to a Personal Identification Number (PIN) that the user desires to enter, from said on-screen keypad to said on-screen target zone; wherein injecting the user interface interference comprises: injecting a user interface interference to an operation of said drag-and-drop interface; wherein the monitoring of interactions comprises: monitoring a manner in which the user reacts to the injected user-interface interference to the operation of said drag-and-drop interface, and extracting a user-specific trait from the corrective reaction of the user.

In some embodiments, the presenting comprises: presenting an on-screen vault interface having one or more on-screen cylinders; generating an on-screen interface that allows the user to selectively rotate the one or more on-screen rotatable cylinders in order to input a Personal Identification Number (PIN) that the user desires to enter; wherein injecting the user interface interference comprises: injecting a user interface interference to an operation of said rotatable cylinders; wherein the monitoring of interactions comprises: monitoring a manner in which the user reacts to the injected user-interface interference to the operation of said on-screen rotatable cylinders, and extracting a user-specific trait from the corrective reaction of the user.

In some embodiments, the injected user-interface interference causes an on-screen pointer to be non-responsive for a pre-defined period of time.

In some embodiments, the injected user-interface interference causes an on-screen pointer to move in a route that is non-identical to a movement route of said input unit.

In some embodiments, the method comprises: presenting an on-screen collection of items; presenting to the user a textual notification that the user is required to select a particular item from said collection, wherein the textual notification comprise a textual instruction in a natural language that a human user is required to comprehend in order to correctly select said particular item from said collection; introducing an interference to a drag-and-drop operation of said particular item; checking whether a current reaction of the user to said interference, matches a user-specific profile of said user indicating past reactions of said user to said interference.

In some embodiments, the method comprises: presenting an on-screen jigsaw puzzle as part of a login process; monitoring a manner in which the user solves the on-screen jigsaw puzzle; extracting a user-specific profile corresponding to the manner in which the user solves the on-screen jigsaw puzzle; in a subsequent login process, checking whether (a) a current manner of the user solving the on-screen jigsaw puzzle, matches (b) the user-specific profile corresponding to the manner in which the user solved the on-screen jigsaw puzzle in previous login sessions.

In some embodiments, the method comprises: during a log-in process and while the user enters user credentials through a mobile computing device, injecting a time-delay between (A) tapping of a character on an on-screen keyboard by the user, and (B) displaying said character on the screen of the mobile computing device; monitoring user reactions to the injected time-delay between tapping and displaying; extracting a user-specific profile reflecting a typical reaction of said user to injected time-delays between tapping and displaying; in a subsequent log-in session, checking whether (i) a current reaction of the user to time-delay between tapping and displaying, matches (ii) the user-specific profile reflecting the typical reaction of said user to injected time-delays between tapping and displaying.

In some embodiments, the method comprises: during a log-in process, causing an Enter key to be non-responsive to keystrokes; presenting an on-screen Submit button; introducing an on-screen interference to regular operation of said on-screen Submit button; monitoring user reactions to the on-screen interference to the regular operation of said on-screen Submit button; extracting a user-specific profile reflecting a typical reaction of said user to the on-screen interference to the regular operation of said on-screen Submit button; in a subsequent log-in session, checking whether (i) a current reaction of the user to the on-screen interference to the regular operation of the on-screen Submit button, matches (ii) the user-specific profile reflecting the typical reaction of said user to the on-screen interference to the regular operation of the on-screen Submit button.

In some embodiments, the method comprises: performing an implicit two-factor authentication process as a condition for authorizing said user to access said computerized service, wherein a first-step of the implicit two-factor authentication process comprises receiving from the user a correct value of a password previously-defined by said user; wherein a second-step of the implicit two-factor authentication process comprises receiving from said user said correct value in an input manner that exhibits a particular user-specific trait that had been extracted from previous input-unit interactions of said user.

In some embodiments, the method comprises: performing an implicit two-factor authentication process as a condition for authorizing said user to access said computerized service, wherein a first-step of the implicit two-factor authentication process comprises receiving from the user a correct value of a password previously-defined by said user; wherein a second-step of the implicit two-factor authentication process comprises: injecting a user interface interference to an interface presented to said user; and receiving from said user said correct value in an input manner which reacts to said interference and which exhibits a particular user-specific trait that had been extracted from previous input-unit interactions of said user in response to said interference.

In some embodiments, the method comprises: presenting to the user, one interference at a time, a sequence of user-interface interferences that are selected one at a time from a pool of possible user-interface interferences; monitoring user reactions to the user-interface interferences that were presented to the user, one interference at a time; generating a user-specific general reaction model that reflects a general manner of reactions to user-interface interferences by said user; generating an encryption key by using a parameter of said user-specific general reaction model; encrypting a content item of said user by using said encryption key that was generated based on said user-specific general reaction model.

In some embodiments, the method comprises: upon a user request to decrypt said content item, performing: presenting to the user a single user-interface interference, from the sequence of user-interface interferences that were selected and used for generating the user-specific general reaction model prior to said encrypting step; monitoring a current reaction of said user to the single user-interface interference that is presented to the user; extracting a user-specific value from the current reaction of said user to the single user-interface interference that is presented to the user; calculating a decryption key based on the user-specific value that was extracted from the current reaction of said user to the single user-interface interference that is presented to the user; decrypting said content item by using said decryption key.

In some embodiments, said sequence of user-interface interference comprise a sequence of at least 20 user-interface interferences, that are selected one-at-a-time from a pool comprising at least 100 user-interface interferences.

In some embodiments, the method comprises: performing stochastic encryption of a content item associated with said user, by utilizing an encryption key that is based, at least partially, on a user-specific model that reflects a general manner in which said user responds to at least 10 different user-interface interferences.

In some embodiments, the method comprises: performing stochastic encryption of a content item associated with said user, by utilizing an encryption key that is based, at least partially, on a user-specific model that reflects a general manner in which said user responds to a series of at least 10 different user-interface interferences that were presented to said user one interference at a time; performing stochastic decryption of said content item associated with said user, by utilizing a decryption key that is based, at least partially, on a single reaction of said user to a single user-interface interference that is presented to said user in response to a user request to decrypt said content item.

In some embodiments, the method comprises: performing a stochastic cryptography operation which utilizes, as a cryptographic parameter, a value of a user-specific model of reaction to a user interface interference of a particular type.

In some embodiments, the method comprises: injecting a user interface interference to an interaction of said user with said computerized service; monitoring user reaction to said user interface interference; extracting a user-specific inter-ference-specific parameter which indicates an attribute of the user reaction to said user interface interference; performing a stochastic cryptography operation which utilizes, as a cryptographic parameter, a value of said user-specific inter-ference-specific parameter which indicates said attribute of the user reaction to said user interface interference.

In some embodiments, the method comprises: estimating a false positive margin-of-error of said stochastic cryptography operation; allowing the user to perform multiple access attempts to compensate for the estimated false positive margin-of-error of said stochastic cryptography operation.

In some embodiments, the stochastic cryptography operation comprises at least one of: encryption, decryption.

In some embodiments, the cryptographic parameter comprises: a value of said user-specific interference-specific parameter which indicates said attribute of the user reaction to said user interface interference which is introduced during said visual login process.

In some embodiments, a system comprises: a visual login module to differentiate between a first user and a second user of a computerized service, wherein the visual login module is: to present an on-screen visual login interface which requires a user of the computerized service to interact with user interface elements in order to enter user login credentials for said computerized service; to monitor interactions of said used via an input unit with said user interface elements of said on-screen visual login interface; to extract from said interaction of the user via the input unit, a user-specific trait indicating a user-specific manner of interaction with said on-screen visual login interface; based on the extracted user-specific manner of interaction, to differentiate between a first user and a second user of said computerized service.

In some embodiments, the visual login module is to perform an implicit two-factor authentication process as a condition for authorizing said user to access said computerized device, wherein a first-step of the implicit two-factor authentication process comprises receiving from the user a correct value of a password previously-defined by said user; wherein a second-step of the implicit two-factor authentication process comprises receiving from said user said correct value in an input manner that exhibits a particular user-specific trait that had been extracted from previous input-unit interactions of said user.

In some embodiments, the system comprises a stochastic cryptography module, wherein the stochastic cryptography module is: to inject a user interface interference to an interaction of said user with said computerized service; to monitor user reaction to said user interface interference; to extract a user-specific interference-specific parameter which indicates an attribute of the user reaction to said user interface interference; to perform a stochastic cryptography operation which utilizes, as a cryptographic parameter, a value of said user-specific interference-specific parameter which indicates said attribute of the user reaction to said user interface interference.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

In some embodiments, a system comprises: a multiple-users for same account detector, to determine that a particular subscription account of a computerized service, is accessed by two different human users who utilize a same set of login credentials; wherein the multiple-users for same account detector is: (a) to extract one or more user-specific behavioral (and/or cognitive, and/or physiological) features from user interactions that are monitored and accumulated over a period of time, from one or more usage sessions in which said particular subscription account is accessed; (b) to determine, for each one of said one or more user-specific behavioral features, a value distribution having two or more peaks which are indicative of the number of users who generated the user interactions that were monitored; (c) based on the number of peaks in said value distribution, to determine the number of different users who utilize the same set of login credentials.

In some embodiments, the one or more user-specific behavioral features, may be or may comprise: a user-specific cognitive feature that is reflected in the monitored user interactions, and/or a user-specific physiological feature that is reflected in the monitored user interactions.

In a demonstrative implementation, the interactions of users with the computerized service, via input devices (e.g., keyboard, mouse, touchpad, touch-screen) and/or via electronic devices (e.g., smartphone, tablet, smart-watch) is monitored and tracked; and the system monitor and logs characteristics of such interactions, for example: the curvature of the movement of the on-screen pointer; the linearity or non-linearity of the movement of the on-screen pointer; the length of stroke(s) that move the on-screen pointer; the length of stroke(s) that move the mouse; the length of stroke(s) of a finger that slides on the touch-screen or the touch-pad; the acceleration and/or deceleration of such movements or of the on-screen pointer; the velocity or speed of such movements or of the on-screen pointer; the speed or rate of typing; the time-gaps between key-down and key-up events; the utilization of a Submit button versus the utilization of the Enter key, to submit a form; the utilization of a Tab key to move between fields, versus the utilization of on-screen pointer movements via other means; the orientation of the electronic device while, or immediately before, or immediately after, the user interaction; and/or other suitable parameters or features).

For each such feature, the measured values or the sensed values are distributed in a certain manner or a particular distribution pattern. In a first demonstrative example, the system identifies a first distribution-pattern of the measured values, that characterizes the interactions of a particular single user who accesses a particular single account. For example, a usage session of the user Adam is tracked, when he accesses his Streaming Music account, from 9:05 PM to 9:47 PM, as he clicks on various on-screen buttons and elements to choose songs to be played, and as he moves the on-screen pointer among such on-screen GUI elements. The measured values for user Adam, are distributed as a first distribution pattern; for example, having one single Peak (e.g., indicating that an on-screen stroke of user Adam is approximately peaking at around 320 pixels per stroke). On the next day, another user, Bob, accesses the same Stream Music account (for example, by entering the log-in credentials of user Adam); and the system measures and tracks the user interactions during that subsequent usage session (performed by Bob). The system identifies a second, different, distribution pattern, for that second usage session of Bob.

For example, the system may identify that in the second distribution pattern, the on-screen stroke length is peaking at around 145 pixels per stroke; indicating that the user of the second usage session (Bob) performs short or shorter strokes when he interacts with the input unit, relative to the first user of the first usage session (Adam) who performs long or longer strokes. Additionally or alternatively, the system may identify that in the second usage session (of Bob), there are actually two (or more) peaks of distribution values; for example, a peak at 145 pixels per stroke, and another peak at 190 pixels per stroke; indicating that the second user (Bob) utilizes short-length strokes and also utilizes medium-length strokes, in contrast with the first user (Adam) that typically utilizes large-length strokes.

In some embodiments, the system may determine that the same account was accessed (e.g., at two different points in time; or, substantially in parallel, or in overlapping time-periods, or in partially-overlapping time periods) by two different human users; for example, by identifying that a first usage-session has a single Distribution Peak at value P1, whereas the second usage-session has a single Distribution Peak at value P2; or, by identifying that the first usage-session has a single Distribution Peak at value P1, whereas the second usage-session has two (or more) Distribution Peaks (for example, has both peak P1 and peak P3; or, has peak P4 and peak P5); or, by identifying that the first usage-session has a first number (N) of Distribution Peaks, whereas the second usage-session has a second and different number (M) of Distribution Peaks (namely, N is different than M); or, by identifying that the first usage-session has a first number (K) of two-or-more Distribution Peaks, whereas the second usage-session has the same number (K) of Distribution Peaks but they are located at different values that are not identical and/or overlapping with the Distribution Peaks of the first usage session (for example, the first usage session has Distribution Peaks at values 190 and 320; whereas the second usage session has Distribution Peaks at values 130 and 190).

In some embodiments, a tolerance level controller may operate to control, regulate, modify or set the level of tolerance or the level of sensitivity, that the system utilizes in order to determine whether two (or more) usage sessions are estimated to be associated with two (or more) different users. For example, the tolerance/sensitivity level controller may be configured such that a deviation of up to T percent from a value of a Distribution Peak, will not be regarded as a different Distribution Peak if it is observed in a different usage session. In a demonstrative example, interactions of user Adam have a Distribution Peak at the value of 200 (for example, 200 pixels per stroke); in a subsequent usage session in the same account, a Distribution Peak is identified at a close value of 197; the tolerance/sensitivity threshold may be defined or configured as T=5 percent; and therefore, the second value (197) is determined to be sufficiently close to the first value (200), such that both of these usage sessions may be attributed to the same user.

In some embodiments, the system may establish or determine "baseline" distribution peak(s) for a particular subscription account, by using a single usage session; or by utilizing a set of multiple usage sessions that are analyzed in aggregate. For example, in a first usage session on Monday the system identifies a single Distribution Peak at value 190; in a second usage session on Tuesday the system identifies a single Distribution Peak at value 188; in a third usage session on Wednesday the system identifies a single Distribution Peak at value 193; in a fourth usage session on Thursday the system identifies a single Distribution Peak at value 187; and based on these multiple usage sessions, the system may determine that there exists a single Distribution Peak, located at value 189, with tolerance/sensitivity of (for example) plus or minus three percent around that value. Subsequently, on Friday, the system may observe a fifth usage session in which the Distribution Peak for that particular user-specific feature, is located at value 127, thus enabling the system to determine that the fifth usage session is attributed to a second, different, user who is different from the first and single user of the first four usage sessions.

In some embodiments, the system may analyze the distribution of values over time in a particular subscription account, and may identify one or more (or multiple) Distribution Peak value(s), and may deduce from them whether or not the account is used by multiple users; and may also estimate, based on the number of such distribution peaks, and/or based on the "shift" or movement or change in the value(s) of such distribution peaks, how many different users are estimated to be sharing the same log-in credentials. For example, for a particular user-specific characteristic that is measured or monitored by the system, identifying a Distribution Peak at value 210 on Sunday, and identifying a Distribution Peak at value 285 on Monday, and identifying a Distribution Peak at value 138 on Tuesday, may enable the system to estimate or to determine that Three different users have accessed that particular account over those three usage-sessions.

Accordingly, in some embodiments, the multiple-users for same account detector is to determine that two different users have used the same account, based on identification of: (i) a first value of distribution peak that characterizes a first usage-session, and (ii) a second, different, value of distribution peak that characterizes a second usage-session.

In some embodiments, the multiple-users for same account detector is to determine that two different users have used the same account, based on identification of: (i) a first number of distribution peaks that are identified in a first usage-session, and (ii) a second, different, number of distribution peaks that are identified in a second usage-session.

In some embodiments, the multiple-users for same account detector is to determine the number of different users that have used the same account, by analyzing both (I) the number of distribution peaks and (II) the values of distribution peaks, of distributed values that reflect a user-specific characteristic of interacting with the computerized service via an input unit of the electronic device.

In some embodiments, the multiple-users for same account detector is to determine the number of different users that have used the same account, by analyzing at least one of (I) the number of distribution peaks and (II) the values of distribution peaks, of distributed values that reflect a user-specific characteristic of interacting with the computerized service via an input unit of the electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:
1. A method comprising:
    determining that a particular subscription account of a computerized service, is accessed by two different human users who utilize a same set of login credentials, by performing:
(a) monitoring input-unit interactions of pairs of usage sessions that originated from two different users;
(b) extracting from the input-unit interactions that were monitored in step (a), a cross-account usage-session pairing pattern;
(c) monitoring input-unit interactions of pairs of usage sessions that originated from a same human user;

(d) extracting from the input-unit interactions that were monitored in step (c), an intra-account usage-session pairing pattern;
(e) determining whether a pair of usage sessions, that originated from a particular subscription account, is either: (i) relatively more similar to the cross-account usage-session pairing pattern, or (ii) relatively more similar to the intra-account usage-session pairing pattern;
wherein the monitoring of step (a) comprises: monitoring input-unit interactions of pairs of usage sessions that originated from two different human users and which comprise user reactions to user interface elements that are presented to users;
wherein the monitoring of step (c) comprises: monitoring input-unit interactions of pairs of usage sessions that originated from said same human user and which comprise user reactions to user interface elements that are presented to users.

2. The method of claim 1, wherein, if it is determined in step (e) that the pair of usage session, that originated from said particular subscription account, is relatively more similar to the cross-account usage-session pairing pattern, then generating a notification that said particular subscription account is accessed by two different human users who utilize the same set of login credentials.

3. The method of claim 1, wherein the monitoring of step (a) further comprises: monitoring also input-unit interactions of pairs of usage sessions that originated from pairs of two different subscriptions accounts and which comprise natural interactions that are not induced by any user-interface interference;
wherein the monitoring of step (c) further comprises: monitoring also input-unit interactions of pairs of usage sessions that originated from a same subscription account and which comprise natural interactions that are not induced by any user-interface interference.

4. The method of claim 1, comprising:
checking whether a characteristic of monitored user-interface interactions over a pair of usage-sessions of a same subscription account, is more similar to either: (i) a first pattern of user-interface interactions that characterize multiple pairs of usage sessions of different human users, or (ii) a second pattern of user-interface interactions that characterizes multiple pairs of usage sessions wherein each pair of usage sessions belongs to the same subscription account.

5. The method of claim 4, comprising:
if it is determined that said characteristic of monitored user-interface interactions, over said pair of usage-sessions of the same subscription account, is more similar to said first pattern of user-interface interactions that characterize multiple pairs of usage sessions of different human users, then generating a notification that said particular subscription account is accessed by two different human users who utilize the same set of login credentials.

6. The method of claim 1, comprising:
checking whether a characteristic of monitored user-interface interactions over a pair of usage-sessions of a same subscription account, that comprise user reactions to an injected user-interface interference, is more similar to either: (i) a first pattern of user-interface interactions that characterize multiple pairs of usage sessions of different human users, or (ii) a second pattern of user-interface interactions that characterizes multiple pairs of usage sessions wherein each pair of usage session belong to the same subscription account.

7. The method of claim 6, comprising:
if it is determined that said characteristic of monitored user-interface interactions, over said pair of usage-sessions of the same subscription account, that comprise user reactions to said injected user-interface interference, is more similar to said first pattern of user-interface interactions that characterize multiple pairs of usage sessions of different human users, then generating a notification that said particular subscription account is accessed by two different human users who utilize the same set of login credentials.

8. The method of claim 1, wherein said computerized service comprises a service selected from the group consisting of:
a digital streaming video service;
a digital streaming audio service;
an online gaming service.

9. The method of claim 1, wherein said computerized service comprises a service selected from the group consisting of:
an online premium-content service available only to paying subscribers;
an online legal information service available only to paying subscribers;
an online financial information service available only to paying subscribers;
an online business information service available only to paying subscribers;
an online news information service available only to paying subscribers.

10. The method of claim 1, comprising:
generating an attributes vector for each usage session;
utilizing a clustering algorithm to determine the number of most-probable sources for the usage sessions;
based on the clustering result, determining whether the usage sessions correspond to one use or to multiple users.

11. The method of claim 1, comprising:
generating an ad-hoc model reflecting user-side interactions that were performed in all usage sessions that originated from a particular computing device;
based on said ad-hoc model, for all other usage sessions accesses using a different device, comparing said usage sessions to said model;
if a particular usage session is determined to be significantly different than said ad-hoc model, then determining the said particular usage session originated from a different user.

12. A process comprising:
determining that a particular subscription account of a computerized service, is accessed by two different human users who utilize a same set of login credentials, by performing:
(a) monitoring input-unit interactions of pairs of usage sessions that originated from two different users;
(b) extracting from the input-unit interactions that were monitored in step (a), a cross-account usage-session pairing pattern;
(c) monitoring input-unit interactions of pairs of usage sessions that originated from a same human user;
(d) extracting from the input-unit interactions that were monitored in step (c), an intra-account usage-session pairing pattern;
(e) determining whether a pair of usage sessions, that originated from a particular subscription account, is: (i) relatively more similar to the cross-account usage-session pairing pattern, or (ii) relatively more similar to the intra-account usage-session pairing pattern;

wherein the monitoring of step (a) comprises: monitoring input-unit interactions of pairs of usage sessions that originated from two different human users;

wherein the monitoring of step (c) comprises: monitoring input-unit interactions of pairs of usage sessions that originated from said same human user.

13. The process of claim 12, wherein said computerized service comprises a service selected from the group consisting of:

a digital streaming video service;

a digital streaming audio service;

an online gaming service;

an online premium-content service available only to paying subscribers;

an online legal information service available only to paying subscribers;

an online financial information service available only to paying subscribers;

an online business information service available only to paying subscribers;

an online news information service available only to paying subscribers.

* * * * *